US012017332B2

(12) United States Patent
Abbott et al.

(10) Patent No.: US 12,017,332 B2
(45) Date of Patent: Jun. 25, 2024

(54) BOLT TENSIONING TOOL

(71) Applicant: MILWAUKEE ELECTRIC TOOL CORPORATION, Brookfield, WI (US)

(72) Inventors: Jonathan E. Abbott, Milwaukee, WI (US); Benjamin A. Smith, Milwaukee, WI (US); Brandon L. Yahr, Slinger, WI (US); Josh Rowland, Milwaukee, WI (US); Kris Kanack, Whitewater, WI (US); John S. Dey, IV, New York, NY (US); Jacob P. Schneider, Cedarburg, WI (US); Peter R. Heath, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 633 days.

(21) Appl. No.: 17/212,876

(22) Filed: Mar. 25, 2021

(65) Prior Publication Data

US 2021/0299832 A1 Sep. 30, 2021

Related U.S. Application Data

(60) Provisional application No. 63/040,067, filed on Jun. 17, 2020, provisional application No. 62/994,312, filed on Mar. 25, 2020.

(51) Int. Cl.
*B25B 29/02* (2006.01)
*B25F 5/00* (2006.01)

(52) U.S. Cl.
CPC .............. *B25B 29/02* (2013.01); *B25F 5/005* (2013.01)

(58) Field of Classification Search
CPC ....... B25B 29/02; B25B 21/02; B25B 21/002; B23P 19/06
See application file for complete search history.

(56) References Cited

U.S. PATENT DOCUMENTS

| | | | |
|---|---|---|---|
| 2,130,111 | A | 9/1938 | Whitney et al. |
| 2,736,219 | A | 2/1956 | May |
| 2,776,681 | A | 1/1957 | Hopkins |
| 2,789,597 | A | 4/1957 | Torre |
| 2,852,652 | A | 9/1958 | Rose et al. |
| 2,882,773 | A | 4/1959 | Wing |

(Continued)

FOREIGN PATENT DOCUMENTS

| | | | |
|---|---|---|---|
| CN | 2813222 | Y | 9/2006 |
| CN | 201140330 | Y | 10/2008 |

(Continued)

OTHER PUBLICATIONS

International Search Report and Written Opinion for Application No. PCT/US2021/024199 dated Jul. 14, 2021 (12 pages).

(Continued)

*Primary Examiner* — Lee D Wilson
(74) *Attorney, Agent, or Firm* — Michael Best & Friedrich LLP

(57) ABSTRACT

A bolt tensioning tool includes a housing, an electric motor positioned within the housing, a hydraulic pump positioned within the housing, the pump being driven by the motor to pressurize hydraulic fluid stored within the housing or a remote reservoir, and a tensioning assembly connectable to a bolt for applying tension thereto in response to an applied force by the pressurized hydraulic fluid.

21 Claims, 15 Drawing Sheets

(56) References Cited

U.S. PATENT DOCUMENTS

| | | | | | |
|---|---|---|---|---|---|
| 3,008,362 | A | | 11/1961 | Tucker, Jr. | |
| 3,041,902 | A | | 7/1962 | Wing | |
| 3,077,335 | A | | 2/1963 | Singleton | |
| 3,095,106 | A | | 6/1963 | Morrison | |
| 3,162,071 | A | | 12/1964 | Biach | |
| 3,362,682 | A | | 1/1968 | Meschonat et al. | |
| 3,603,132 | A | | 9/1971 | Holmes | |
| 3,679,173 | A | | 7/1972 | Sherrick et al. | |
| 3,844,533 | A | | 10/1974 | Markiewicz et al. | |
| 3,877,326 | A | | 4/1975 | Kock et al. | |
| 3,906,819 | A | | 9/1975 | Curtis | |
| 3,917,224 | A | | 11/1975 | Stansfield et al. | |
| 3,965,565 | A | | 6/1976 | Fujii | |
| 3,995,828 | A | | 12/1976 | Orban | |
| 4,027,559 | A | | 6/1977 | Wallrafen | |
| 4,052,652 | A | | 10/1977 | Simnovec et al. | |
| 4,104,934 | A | | 8/1978 | Raschke et al. | |
| 4,175,453 | A | | 11/1979 | Exner et al. | |
| 4,224,843 | A | | 9/1980 | Heiermann et al. | |
| 4,244,245 | A | | 1/1981 | Wallace et al. | |
| 4,249,718 | A | | 2/1981 | Heaton | |
| 4,273,011 | A | | 6/1981 | Exner et al. | |
| 4,281,580 | A | | 8/1981 | Bunyan | |
| 4,315,446 | A | | 2/1982 | Orban | |
| 4,380,181 | A | | 4/1983 | Bunyan | |
| 4,391,431 | A | | 7/1983 | Maximov | |
| 4,433,828 | A | | 2/1984 | Spiegelman et al. | |
| 4,535,656 | A | | 8/1985 | Orban | |
| 4,581,956 | A | | 4/1986 | Robert | |
| 4,625,554 | A | | 12/1986 | Lanzoni | |
| 4,659,065 | A | | 4/1987 | Simms | |
| 4,708,036 | A | | 11/1987 | Vossbrinck | |
| 4,829,650 | A | | 5/1989 | Galard | |
| 4,998,453 | A | * | 3/1991 | Walton | B25B 29/02 81/57.38 |
| 5,249,208 | A | | 9/1993 | Ruzga et al. | |
| 5,339,512 | A | | 8/1994 | Odsberg et al. | |
| 5,803,436 | A | | 9/1998 | Hohmann et al. | |
| 5,842,263 | A | | 12/1998 | Gosling | |
| 5,927,157 | A | | 7/1999 | Gosling | |
| 6,058,810 | A | | 5/2000 | Junkers | |
| 6,105,471 | A | | 8/2000 | Takayuki et al. | |
| 6,230,589 | B1 | | 5/2001 | Junkers | |
| 6,253,642 | B1 | | 7/2001 | Junkers | |
| 6,421,902 | B1 | | 7/2002 | Loffler | |
| 6,490,952 | B2 | | 12/2002 | Junkers | |
| 6,609,868 | B2 | | 8/2003 | Junkers | |
| 6,810,571 | B1 | | 11/2004 | Junkers | |
| 6,840,726 | B2 | | 1/2005 | Gosling | |
| 7,062,998 | B2 | | 6/2006 | Hohmann et al. | |
| 7,338,240 | B2 | | 3/2008 | Hohmann et al. | |
| 7,469,592 | B2 | | 12/2008 | Hohmann et al. | |
| 7,513,178 | B2 | | 4/2009 | Hohmann et al. | |
| 7,658,131 | B1 | | 2/2010 | Rosa et al. | |
| 7,661,336 | B2 | | 2/2010 | Hohmann et al. | |
| 7,757,587 | B2 | | 7/2010 | Kaneyama et al. | |
| 7,874,232 | B2 | | 1/2011 | Gauthreaux et al. | |
| 7,950,309 | B2 | | 5/2011 | Junkers et al. | |
| 8,261,421 | B2 | | 9/2012 | Monville | |
| 8,302,509 | B2 | | 11/2012 | Hohmann et al. | |
| 8,375,554 | B2 | | 2/2013 | Wagner et al. | |
| 8,616,094 | B2 | | 12/2013 | Hohmann et al. | |
| 8,667,789 | B2 | | 3/2014 | Thelen et al. | |
| 9,193,051 | B2 | | 11/2015 | Declerck | |
| 9,248,532 | B2 | | 2/2016 | Wagner et al. | |
| 9,289,888 | B2 | | 3/2016 | Kastner | |
| 9,381,632 | B2 | | 7/2016 | Hohmann et al. | |
| 9,415,493 | B2 | | 8/2016 | Hohmann et al. | |
| 9,457,439 | B2 | | 10/2016 | Imi | |
| 9,573,231 | B2 | | 2/2017 | Rice | |
| 9,623,524 | B2 | | 4/2017 | Hohmann et al. | |
| 9,718,176 | B2 | | 8/2017 | Elsmark et al. | |
| 9,744,656 | B2 | | 8/2017 | Hohmann et al. | |
| 9,874,503 | B2 | | 1/2018 | Morgan | |
| 9,878,430 | B2 | | 1/2018 | Hohmann et al. | |
| 9,981,369 | B2 | | 5/2018 | Hohmann et al. | |
| 2005/0155461 | A1 | | 7/2005 | Junkers | |
| 2005/0191153 | A1 | | 9/2005 | McIntyre et al. | |
| 2006/0236817 | A1 | | 10/2006 | Junkers | |
| 2006/0243100 | A1 | | 11/2006 | Junkers et al. | |
| 2011/0192257 | A1 | | 8/2011 | Armstrong | |
| 2011/0271798 | A1 | | 11/2011 | Wagner et al. | |
| 2013/0008015 | A1 | | 1/2013 | Junkers | |
| 2014/0020515 | A1 | | 1/2014 | Hohmann et al. | |
| 2015/0314431 | A1 | * | 11/2015 | Hohmann | B23P 19/067 81/57.38 |
| 2016/0271775 | A1 | | 9/2016 | Hohmann et al. | |
| 2016/0375563 | A1 | * | 12/2016 | Junkers | B25F 5/026 81/467 |
| 2017/0021478 | A1 | * | 1/2017 | Junkers | B25B 13/488 |
| 2017/0087675 | A1 | | 3/2017 | Hohmann et al. | |
| 2017/0095896 | A1 | | 4/2017 | Hohmann et al. | |
| 2017/0095915 | A1 | * | 4/2017 | Jaeger | B25B 29/02 |
| 2017/0203397 | A1 | | 7/2017 | Gethings et al. | |
| 2017/0334048 | A1 | | 11/2017 | Bartels et al. | |
| 2018/0015577 | A1 | * | 1/2018 | Hohmann | G01B 21/02 |
| 2018/0190402 | A1 | | 7/2018 | Shaw et al. | |
| 2018/0257203 | A1 | | 9/2018 | Dolan | |
| 2019/0111555 | A1 | | 4/2019 | Abbott | |
| 2021/0252677 | A1 | * | 8/2021 | Karoliussen | B25B 21/005 |
| 2022/0226976 | A1 | * | 7/2022 | Basson | B25B 29/02 |
| 2022/0331939 | A1 | * | 10/2022 | Foley | B25B 29/02 |

FOREIGN PATENT DOCUMENTS

| | | | | | |
|---|---|---|---|---|---|
| CN | 201267983 | Y | | 7/2009 | |
| CN | 201632994 | U | | 11/2010 | |
| CN | 201677168 | U | | 12/2010 | |
| CN | 201677169 | U | | 12/2010 | |
| CN | 202448105 | U | | 9/2012 | |
| CN | 203209954 | U | | 9/2013 | |
| CN | 203936612 | U | | 11/2014 | |
| CN | 105414948 | A | | 3/2016 | |
| CN | 106271563 | A | | 1/2017 | |
| CN | 106329399 | A | | 1/2017 | |
| CN | 107234425 | A | | 10/2017 | |
| CN | 206869426 | U | | 1/2018 | |
| CN | 107695951 | A | | 2/2018 | |
| CN | 207548670 | U | | 6/2018 | |
| CN | 106602470 | B | | 7/2018 | |
| DE | 1248580 | B | | 8/1967 | |
| DE | 2243045 | A1 | | 3/1974 | |
| DE | 2430073 | A1 | | 1/1976 | |
| DE | 2445463 | C2 | | 11/1976 | |
| DE | 2719065 | A1 | | 11/1977 | |
| DE | 3047705 | A1 | | 7/1982 | |
| DE | 2229073 | C2 | | 11/1983 | |
| DE | 2815361 | C2 | | 1/1984 | |
| DE | 3047674 | C2 | | 2/1988 | |
| DE | 2814073 | C2 | | 9/1988 | |
| DE | 3237324 | C2 | | 4/1989 | |
| DE | 4300664 | C2 | | 7/1996 | |
| DE | 19638901 | C2 | | 5/2000 | |
| DE | 19920756 | A1 | | 11/2000 | |
| DE | 102005043095 | A1 | | 3/2007 | |
| DE | 10124443 | B4 | | 7/2008 | |
| DE | 102009023518 | B4 | | 12/2011 | |
| EP | 3047951 | A1 | | 7/2016 | |
| EP | 2871027 | B1 | | 10/2016 | |
| EP | 2711099 | B1 | | 5/2017 | |
| EP | 3195991 | A1 | | 7/2017 | |
| EP | 3210717 | A1 | | 8/2017 | |
| GB | 1321398 | A | | 6/1973 | |
| JP | 2020011376 | A | | 1/2020 | |
| WO | WO2000019115 | A1 | | 4/2000 | |
| WO | WO2006024833 | A1 | | 3/2006 | |
| WO | WO2007000573 | A2 | | 1/2007 | |
| WO | WO2012018396 | A1 | | 2/2012 | |
| WO | WO2017218870 | A1 | | 12/2017 | |
| WO | WO2018044178 | A1 | | 3/2018 | |
| WO | WO2018054485 | A1 | | 3/2018 | |
| WO | WO-2019245384 | A1 | * | 12/2019 | B25B 21/00 |

(56) References Cited

FOREIGN PATENT DOCUMENTS

OTHER PUBLICATIONS

Hangzhou Civit Instrument Equipment Co., Ltd, "Digital Standard Concrete Anchor Pullout Tester Test Machine," <https://civittest.en.made-in-china.com/product/JKymzGpBvPrl/China-Digital-Standard-Concrete-Anchor-Pullout-Tester-Test-Machine.html>, web page publicly available at least as early as Jun. 6, 2020, representative copy filed with IDS was captured May 2021 (3 pages).
Hydrajaws, Home website page, <https://www.hydrajaws.co.uk/ >, web page publicly available at least as early as Jun. 6, 2020, representative copy filed with IDS was captured May 2021 (1 page).
Hydratight, "Why Tension?," <https://www.hydratight.com/en/products/tension/why-tension>, web page publicly available at least as early as Oct. 31, 2018, representative copy filed with IDS was captured May 2021 (1 page).
ITH Bolting Technology, "Hydraulic Bolt Tensioning Cylinder type MS, multi-staged," <https://www.ith.com/en/tension-and-torque-tools/hydraulic-bolt-tensioning-and-equipment/multi-stage-bolt-tensioning-cylinder-type-MS.php>, web page publicly available at least as early as Oct. 31, 2018, representative copy filed with IDS was captured May 2021 (1 page).
Powermaster, "Hydraulic Bolt Tensioners," <https://www.powermaster.in/en/bolting-tools/hydraulic-bolt-tensioners.asp>, web page publicly available at least as early as Oct. 31, 2018, representative copy filed with IDS was captured May 2021 (1 page).
YouTube, "How to Tension Using a Hydraulic Bolt Tensioner (HET)," <https://www.youtube.com/watch?app=desktop&v=7w07D7SakU0&feature=youtu.be>, posted Oct. 10, 2014, (12 pages).
YouTube, "How Bolt Tensioners Work," <https://youtu.be/ef9CXDhzH-U>, posted May 23, 2012, (8 pages).

* cited by examiner

BOLT TENSIONING TOOL

CROSS-REFERENCE TO RELATED APPLICATIONS

This application claims priority to U.S. Provisional Patent Application No. 63/040,067 filed on Jun. 17, 2020 and U.S. Provisional Patent Application No. 62/994,312 filed on Mar. 25, 2020, the entire contents of all of which are incorporated herein by reference.

FIELD OF THE INVENTION

The present invention relates generally to a device for tensioning bolts.

BACKGROUND OF THE INVENTION

In certain applications, such as bolting applications, it is often desirable to achieve a given tension to create a fastened joint. One approach to accomplishing this is to preload bolts using bolt tensioning tools, which are most commonly powered by pressurized hydraulic fluid, and require a pump and motor assembly to supply the tool with pressurized hydraulic fluid.

SUMMARY OF THE INVENTION

The present invention provides, in one aspect, a bolt tensioning tool including a housing, an electric motor positioned within the housing, a hydraulic pump positioned within the housing, the pump being driven by the motor to pressurize hydraulic fluid stored within the housing or a remote reservoir, and a tensioning assembly connectable to a bolt for applying tension thereto in response to an applied force by the pressurized hydraulic fluid.

The present invention provides, in another aspect, a bolt tensioning system including at least two bolt tensioning tools, each tool including a housing, an electric motor positioned within the housing, a hydraulic pump positioned within the housing, the pump being driven by the motor to pressurize hydraulic fluid stored within the housing or a remote reservoir, and a tensioning assembly connectable to a bolt for applying tension thereto in response to an applied force by the pressurized hydraulic fluid. The system further includes a controller disposed in a first of the bolt tensioning tools for transmitting instructions to a second of the bolt tensioning tools for performing a bolt tensioning operation, and a receiver in the second bolt tensioning tool to receive the instructions from the first bolt tensioning tool.

The present invention provides, in another aspect, a bolt configured to be tensioned by a bolt tensioning tool. The bolt includes a head and a shaft. The shaft includes a threaded portion configured to be engaged by a nut, an end portion including a means for engagement with the bolt tensioning tool, and a yield portion between the threaded portion and the end portion configured to stretch in response to a tensile strength of the shaft being exceeded during a bolt tensioning operation.

The present invention provides, in another aspect, a bolt tensioning system including a bolt and a bolt tensioning tool. The bolt includes a head and a shaft. The shaft includes a threaded portion configured to be engaged by a nut, an end portion including a means for engagement with a bolt tensioning tool, and a yield portion between the threaded portion and the end portion. The bolt tensioning tool includes a housing, an electric motor positioned within the housing, and a hydraulic pump positioned within the housing. The hydraulic pump is driven by the motor to pressurize hydraulic fluid, which may be stored within the housing or a remote reservoir. The bolt tensioning tool also includes a tensioning assembly connectable to the engagement means for applying tension to the shaft in response to an applied force by the pressurized hydraulic flow.

The present invention provides, in another aspect, a handheld hydraulic power tool including a housing, an electric motor positioned within the housing, a hydraulic pump positioned within the housing, the pump being driven by the motor to pressurize hydraulic fluid stored within the housing or a remote reservoir, and an installation assembly configured to seat an anchor into a concrete work surface in response to an applied force by the pressurized hydraulic fluid.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
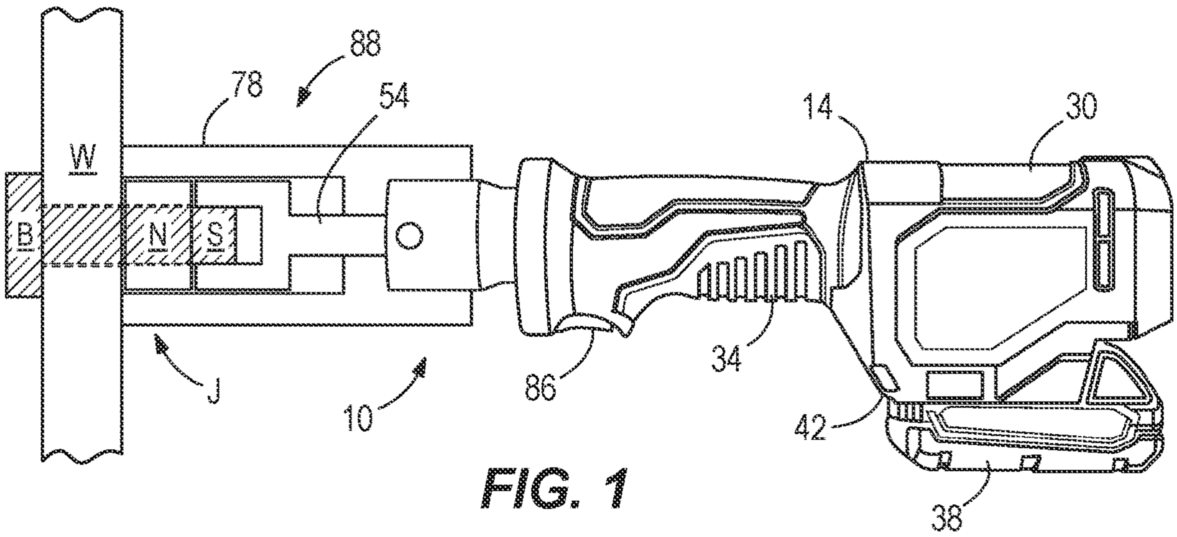
FIG. 1 is a side view of a bolt tensioning tool in accordance with an embodiment of the invention.
Figure 2:
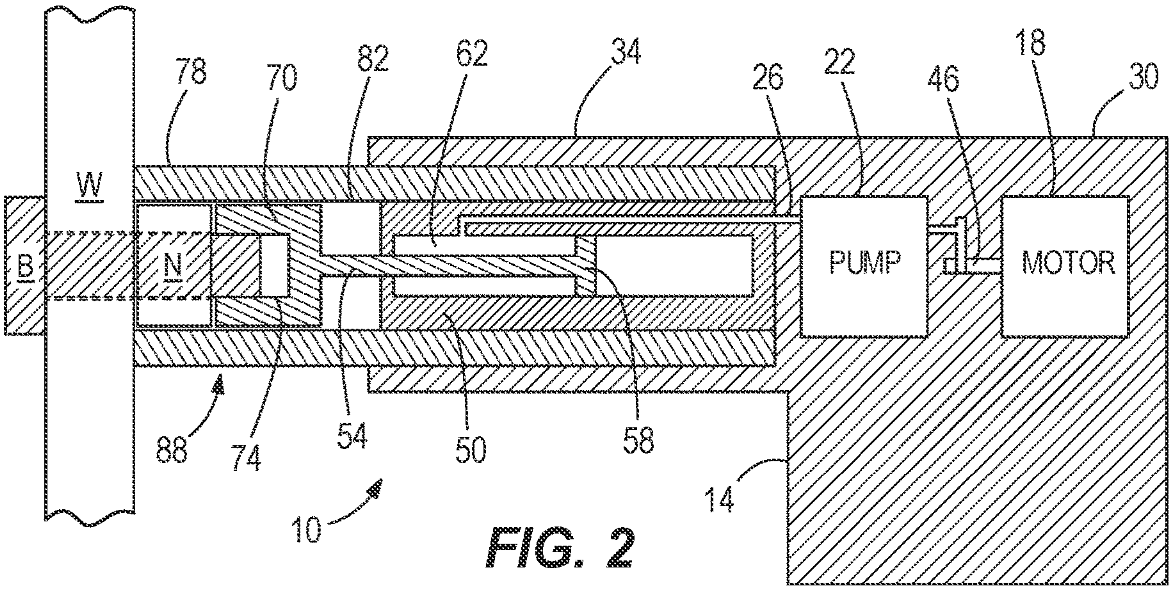
FIG. 2 is a schematic side view of the bolt tensioning tool of FIG. 1.

With reference to FIGS. 1 and 2, a bolt tensioning tool 10 is operable to apply a tensile force to a bolt B fastened to a workpiece W by a threaded nut N, prior to torque being applied to the nut N to create a fastened joint J. Although the workpiece W is schematically illustrated as a single body, the workpiece W may include two or more bodies or objects that are connected by the joint J.

With continued reference to FIGS. 1 and 2, the tool 10 includes a housing 14, an electric motor 18 positioned within the housing 14, and a hydraulic pump 22 positioned within the housing 14 that is driven by the motor 18 to pressurize hydraulic fluid stored within the housing 14 (for example, in an onboard reservoir, not shown). In the illustrated embodiment of the tool 10, the housing 14 includes a motor housing portion 30, in which the motor 18 is positioned, and a handle portion 34 coaxial or in line with the motor housing portion 30 that is grasped by a user when the tool 10 is in use. Alternatively, the handle portion 34 and the motor housing portion 30 may be offset from each other, or disposed at a non-zero angle (i.e., non-coaxial) relative to each other.

As shown in FIG. 1, the tool 10 includes a battery pack 38 removably coupled to a battery receptacle 42 located at the bottom of the motor housing portion 30. The electric motor 18 receives power from the battery pack 38 via the battery receptacle 42 when the battery pack 38 is coupled to the battery receptacle 42. In the illustrated embodiment, the motor 18 is a brushless direct current ("BLDC") motor with a stator and a rotor (not shown) having a motor output shaft 46 that is rotatable about an axis relative to the stator. In other embodiments, other types of motors may be used.

With reference to FIGS. 1 and 2, the tool 10 also includes a cylinder 50 at least partially located within the housing 14 (in particular, the handle portion 34 of the housing 14) and a piston 54 disposed within the cylinder 50. The piston 54 includes a head portion 58 at a rear end thereof (i.e., at the right end of the piston 54 from the frame of reference of FIG. 2) that is in sliding contact with the cylinder 50. As such, an annular chamber 62 is defined between the cylinder 50 and the piston 54 into which pressurized hydraulic fluid is transferred by the pump 22 (via a passageway 26 fluidly communicating the pump 22 and the cylinder 50). Although not shown, a biasing element (e.g., a compression spring) may bias the piston 54 toward an initial extended position relative to the cylinder 50, with the spring being compressed in response to retraction of the piston 54 within the cylinder 50 during a bolt tensioning operation. And, the tool 10 may also include a sensor for detecting the pressure of the hydraulic fluid within the chamber 62 and a valve selectively fluidly communicating the cylinder and the onboard reservoir to return the pressurized hydraulic fluid to the reservoir in response to the detected pressure of the hydraulic fluid within the chamber 62 exceeding a predetermined or user-set threshold, allowing the compression spring to rebound and return the piston 54 to its initial extended position.

The piston 54 also includes a mount 70 at a front end thereof that is connectable to a threaded portion T of the bolt B when the tool 10 is in use. In the illustrated embodiment of the tool 10, the mount 70 includes a threaded inner periphery 74 having a nominal diameter and thread pitch as the threaded portion T. As such, to connect the piston 54 and the bolt B, the piston mount 70 needs only to be threaded to the threaded portion T of the bolt B. Alternatively, the mount 70 may include jaws or an adapter capable of grasping or otherwise temporarily connecting the piston 54 to the threaded portion T during a bolt tensioning operation. In an exemplary embodiment, the mount 70 may be formed as a threaded collet (not shown). The threaded collet may cooperate with an outer sleeve to cinch the collet flanges around the threaded portion T of the bolt B. Further embodiments of the mount 70 are discussed in more detail below.

The tool 10 further includes an anvil 78 extending between the housing 14 (in particular, the handle portion 34 of the housing 14) and the workpiece W. In some embodiments of the tool 10 (FIG. 1), the anvil 78 may be separate from the housing 14, requiring a user to install the anvil 78 between the housing 14 and the workpiece W during each bolt tensioning operation. In other embodiments (FIG. 2), the anvil 78 is integrated with the housing 14 and non-separable from the housing 14. In other embodiments the anvil 78 may be formed from multiple pieces to allow for a system of exchangeable anvils corresponding to different sized nuts and different applications. In yet other embodiments, the anvil 78 may be integrated with the cylinder 50 and non-separable from the cylinder 50. The anvil 78 includes a bore 82 coaxial with the piston 54 in which the piston mount 70 is slidable.

Prior to a bolt tensioning operation, the anvil 78 is positioned between the housing 14 and workpiece W, and then the piston mount 70 is connected to the threaded portion T. To initiate a bolt tensioning operation, a user may depress a trigger 86 located on the handle portion 34 of the housing 14 (FIG. 1), which activates the motor 18. The motor 18 outputs torque via the motor output shaft 46 to the pump 22, thus driving the pump 22 to draw hydraulic fluid 26 from the onboard reservoir and transfer the pressurized hydraulic fluid 26 into the annular chamber 62, thus causing the piston 54 to translate within the cylinder 50 in a rearward direction (i.e., toward the right from the frame of reference of FIG. 2). As the piston 54 translates, a tensile force is applied to the threaded portion T and an equal and opposite reaction force is applied by the anvil 78 to the housing 14 to maintain the housing 14 at a fixed distance relative to the workpiece W. As the tensile force increases, the bolt B is stretched, opening a gap between the workpiece W and the nut N. As used herein, the housing 14 may be configured as an outer housing clamshell enclosing, or substantially enclosing, the motor 18, pump 22, and cylinder 50. However, in some embodiments, the housing 14 may include and/or be configured as an internal housing or case made from a material strong enough to absorb the reaction force applied to the anvil 78.

In some embodiments, the tool 10 includes a user interface that allows a user to preset the tension to be applied to a bolt and displays the tension applied to the bolt in real time during a tensioning operation. The user interface, which may be configured as or alternatively include a display, may be integrated into the housing. Alternatively, in some embodiments, the tool 10 is remotely configurable using a mobile electronic device (e.g., a mobile phone or portable computer). In some embodiments of the tool 10, the user interface may also or alternatively include a series of colored LEDs to indicate different conditions of the tool 10.

Figure 13:
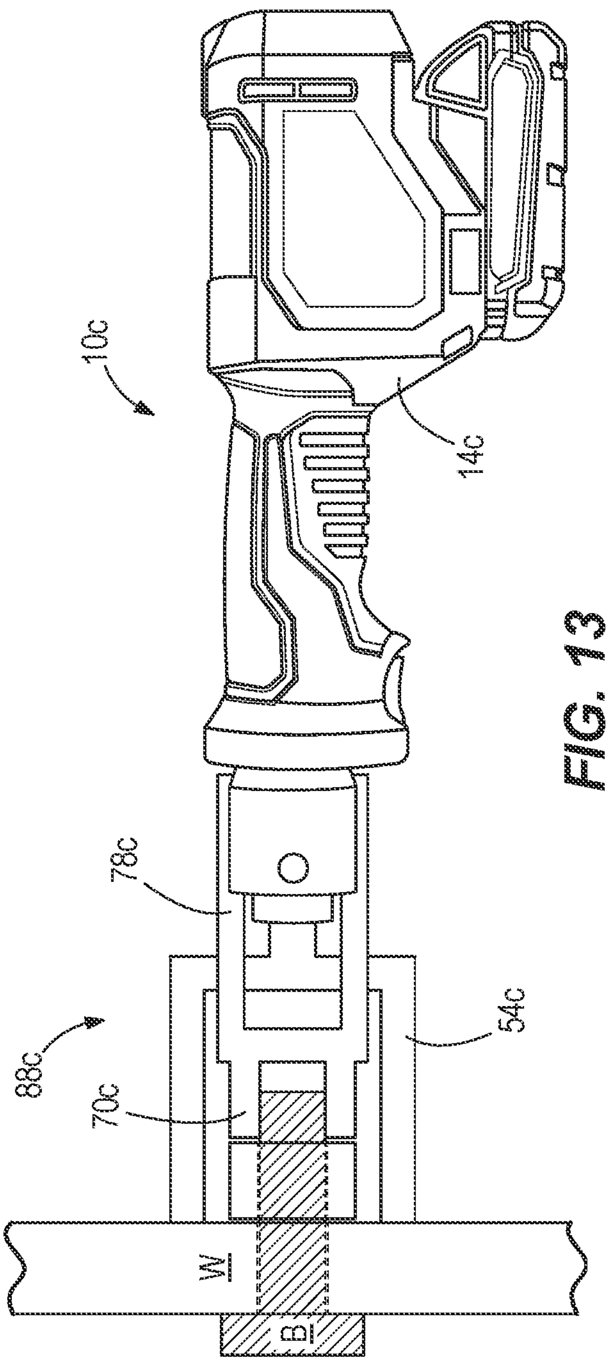
FIG. 13 is a side view of a bolt tensioning tool in accordance with another embodiment of the invention.

In some embodiments, the piston 54 and the anvil 78, amongst other components, collectively define a tensioning assembly 88 connectable to the bolt B for applying tension thereto. In alternative embodiments of the tensioning assembly, such as tensioning assembly 88*c* in bolt tensioning tool 10*c* in FIG. 13 (with like components shown with like reference numerals plus the letter "c"), the piston 54*c* may be abutted against the workpiece W and receive an applied force from the pressurized hydraulic fluid, displacing the piston 54*c* relative to the housing 14*c*. And the anvil 78*c* may be affixed relative to the housing 14*c* and connectable to the bolt B via a mount 70*c*, which may be configured in the same way as the mount 70 described above. In operation of the tool 10*c*, in response to displacement of the piston 54*c* (i.e., extension from the housing 14*c*) caused by the applied force from the pressurized hydraulic fluid, a tensile force is developed through the anvil 78*c* to apply tension to the bolt B, also displacing the housing 14*c* relative to the workpiece W.

Although not shown in FIG. 1 or 2, the anvil 78 includes a lateral opening into the interior of the anvil bore 82, permitting the user to access the nut N (e.g., with a wrench). After the bolt B is stretched a sufficient amount, the motor 18 is deactivated, stopping translation of the piston 54. The motor may be deactivated completely or, more commonly, may be braked or the speed or power reduced, stopping significant translation of the piston 54 but preserving the target pressure and thereby the desired tension. The user may then tighten the nut N to the workpiece W, thereby closing the gap. Thereafter, the pressurized hydraulic fluid 26 may be exhausted from the annular chamber 62 back to the onboard reservoir, permitting the piston 54 to return to its initial extended position. As this occurs, the tensile force on the bolt B is released, permitting the bolt B to rebound to a partially stretched shape. The piston mount 70 is then detached from the threaded portion T, and the tool 10 and the anvil 78 are removed from the fastened joint J. Because the bolt B is elastically deformed during a bolt tensioning operation, a clamping force is developed within the joint J and applied to the workpiece W.

Although the tool 10 uses a sensor for detecting the pressure of the hydraulic fluid within the chamber 62 for determining whether a bolt B has been stretched to a desired tension, in some embodiments, the force applied to the piston 54 may be directly measured (e.g., with a load cell). Such a load cell could be connected in line with the piston 54 for measuring the tensile force applied to the bolt B. Or, the load cell could be located between the anvil 78 and the work piece W for measuring the reaction force applied to the anvil 78 by the work piece W, or the reaction force applied to the housing 14 by the anvil 78. The tool 10 may also include an additional sensor (not shown), such as a displacement sensor, that directly detects the strain applied to the bolt B.

Figure 3A:
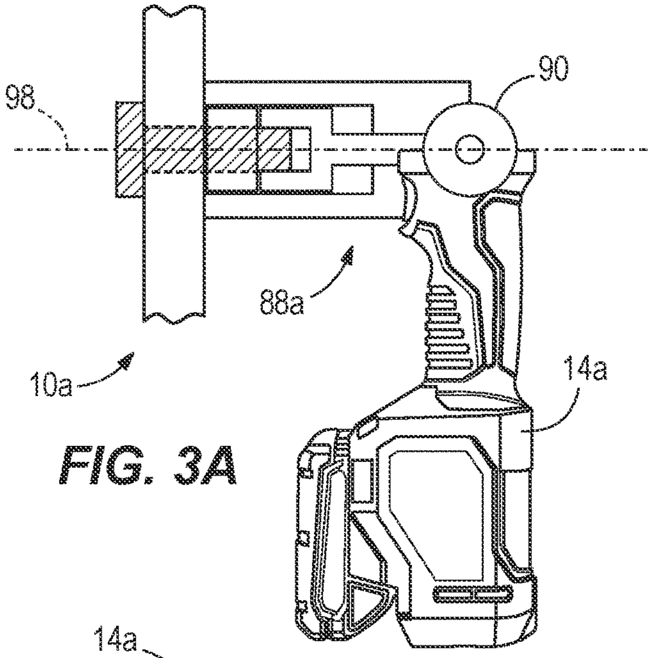
FIG. 3A is a side view of a bolt tensioning tool in accordance with another embodiment of the invention, illustrating the bolt tensioning tool in a first configuration.
Figure 3B:
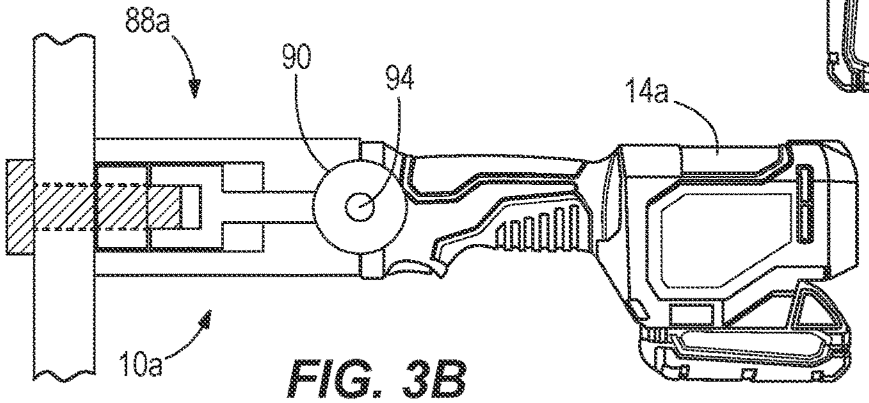
FIG. 3B is a side view of the bolt tensioning tool of FIG. 3A in a second configuration.

A bolt tensioning tool 10*a* in accordance with another embodiment is shown in FIGS. 3A and 3B. Like components and features as the bolt tensioning tool shown in FIGS. 1 and 2 are shown with like reference numerals plus the letter "a" and will not be described again in detail. The tool 10*a* additionally includes a joint (e.g., a pivot 90) coupling the housing 14*a* and the tensioning assembly 88*a*, permitting the housing 14*a* to rotate about a pivot axis 94 (shown by a dot in FIG. 3B) that is transverse to a working axis 98 of the piston 54*a*. The pivot 90 allows the housing 14*a* to move relative to the tensioning assembly 88*a* between a first position (FIG. 3A), in which the housing 14*a* is generally oriented at a right angle relative to the tensioning assembly 88*a*, and a second position (FIG. 3B), in which the housing 14*a* is aligned with the tensioning assembly 88*a*. In some embodiments, the pivot 90 allows the housing 14*a* to be continuously adjusted between the first and second positions, allowing the tool 10*a* to be operated at any intermediate position. In other embodiments, the pivot 90 only allows the housing 14*a* to inhabit discrete positions relative to the tensioning assembly 88*a*, which may include one or more intermediate positions between the first and second position. The pivot 90 allows the tool 10*a* to engage bolts in difficult to reach places.

In some embodiments, the tensioning assembly 88*a* includes swappable components. For example, the cylinder, piston, and/or anvil may be replaced with like components of different size and/or shape in order to match different sizes of bolts B. Other components may also be swappable or replaceable as appropriate.

Figure 4:
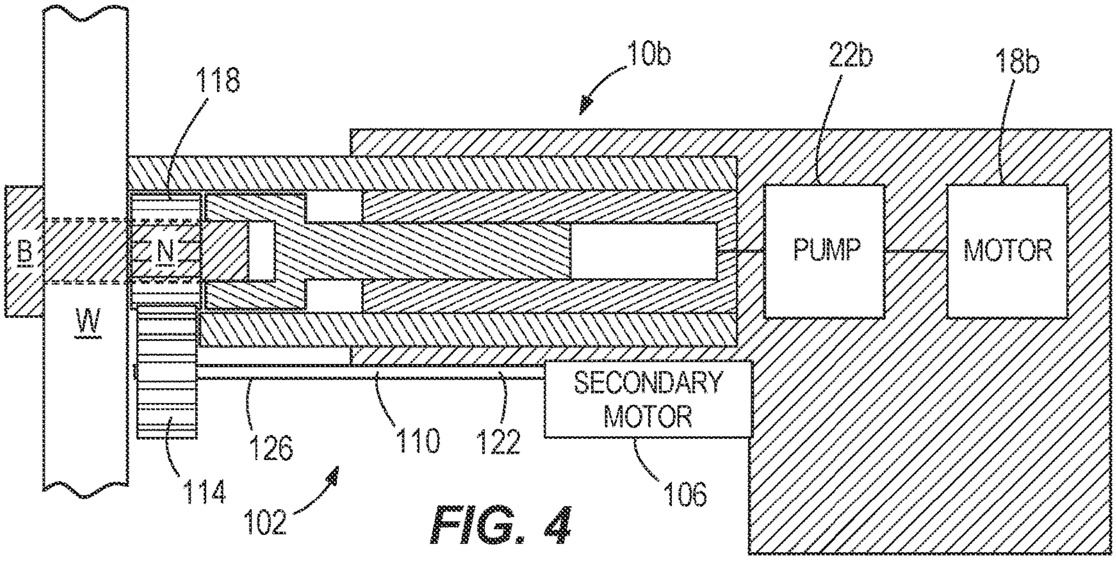
FIG. 4 is a schematic side view of a bolt tensioning tool in accordance with a further embodiment of the invention.
Figure 5:
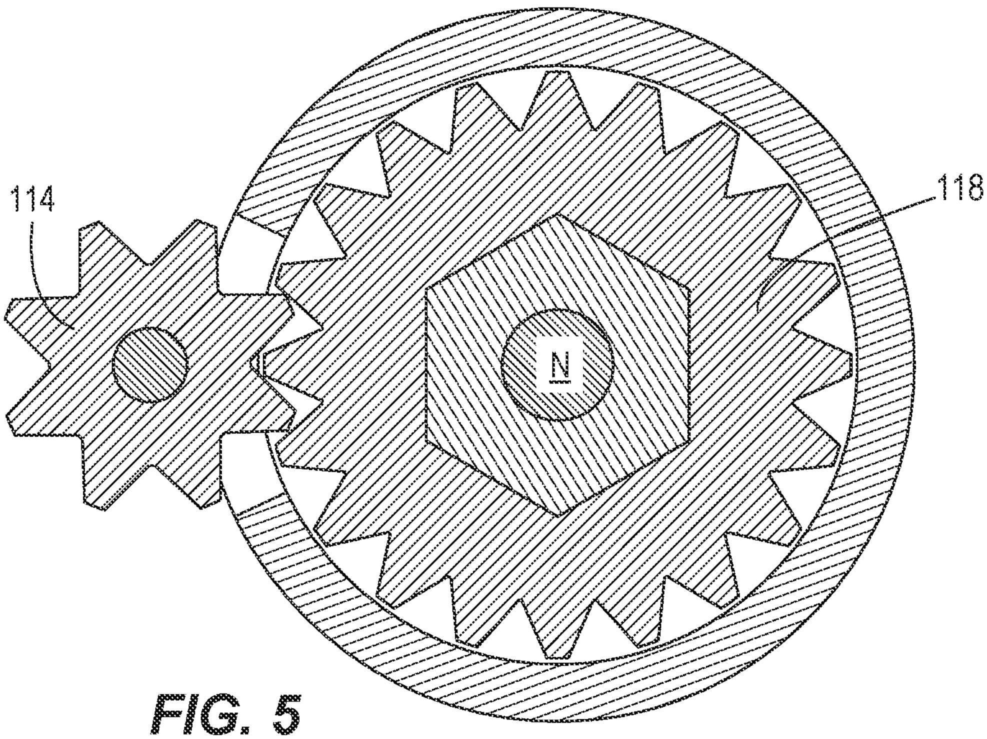
FIG. 5 is a top view of a nut ring for use with the bolt tensioning tool of FIG. 4.

With reference to FIGS. 4 and 5, a bolt tensioning tool 10*b* in accordance with another embodiment is shown. Like components and features as the bolt tensioning tool shown in FIGS. 1 and 2 are shown with like reference numerals plus the letter "b" and will not be described again in detail. The tool 10*b* includes an auxiliary system 102 to tighten the nut N after the bolt B is stretched. The auxiliary system 102 may be removably coupled to the housing 14*b* of the tool 10*b*. In some embodiments, the auxiliary system 102 may be integrated with the tool 14*b* and be at least partially positioned within the housing 14*b*. The system 102 includes a secondary electric motor 106, a rotation shaft 110, a transfer gear 114 and a nut gear 118. The secondary motor 106 may be selectively electrically connected to the battery pack for driving the rotation shaft 110. In some embodiments, the secondary motor 106 may be connected to a secondary battery (not shown). The rotation shaft 110 includes a motor end 122, which is connected to the output of the secondary motor 106, and a gear end 126, which is connected to the transfer gear 114. The transfer gear 114 is meshed with the nut gear 118, which is coaxially disposed around the nut N. Before operation of the tool 10*b*, the nut gear 118 is positioned around the nut N as the tool is lowered onto the workpiece W. After the bolt B has been stretched as described above, the secondary motor 106 is activated to drive the rotation shaft 110, providing torque to the meshed transfer gear 114 and nut gear 118, thereby tightening the nut N to the workpiece W. The auxiliary system 102 may further include an anti-rotation component to prevent back driving or over driving when the engaged threads hit a burr or when the nut is fully tightened against the workpiece W. The anti-rotation component may include an electronic or mechanical clutch, or an anti-rotation control algorithm based on sensor feedback or system parameters. After the nut N is tightened to the workpiece W, the secondary motor 106 is deactivated and the tensile force on the bolt B is relieved as described above, completing the bolt tensioning operation. The height of the nut gear 118 can be increased to move the engagement between the transfer gear 114 and the nut gear 118 away from the workpiece W to allow the tool 10*b* to navigate in tighter spaces.

Alternatively, rather than tightening the nut N to the workpiece W after the bolt B has been stretched to a desired amount, the secondary motor 106 may be activated concurrently with the motor 18*b* to tighten the nut N against the work piece W as the bolt B is stretched, thus inhibiting a gap forming between the nut N and the work piece W. When performing a bolt tensioning operation in this manner, the bolt B may continue to be stretched until exceeding its yield point, thus shearing at a desired tension. Thereafter, because the nut N remains tight against the work piece W during the bolt tensioning operation, the nut N will immediately carry the load of the joint J upon shearing of the bolt B. If using the tool 10*b* in this manner, the sensor for detecting the pressure of hydraulic fluid within the chamber 62 may be omitted, thus simplifying the tool 10*b*, because bolt shanks will always be stretched beyond their yield point without concern for stopping the piston 54*b* at a predetermined or user-set tension value of the bolt B.

In an embodiment of the tool 10*b* including a user interface as described above, the torque applied to the nut N can be displayed to the user in real time during the bolt tensioning operation. And, the torque value to which the nut N is tightened can be preset via the user interface.

In some embodiments, the auxiliary system 102 may not include a secondary motor 106. The rotational shaft 110 may be connected to the main motor 18*b* through a clutch system. The clutch system may be user operated or may be operated by an internal solenoid. The clutch may be mechanical, such as a friction clutch. The auxiliary system 102 may include a set of switches provided to change the gearing, to switch the direction of rotation between forward and reverse, and to optionally disconnect the auxiliary system 102 from the main motor 18*b*. The switches may optionally be incorporated into the movement of a trigger 86*b*.

Figure 6:
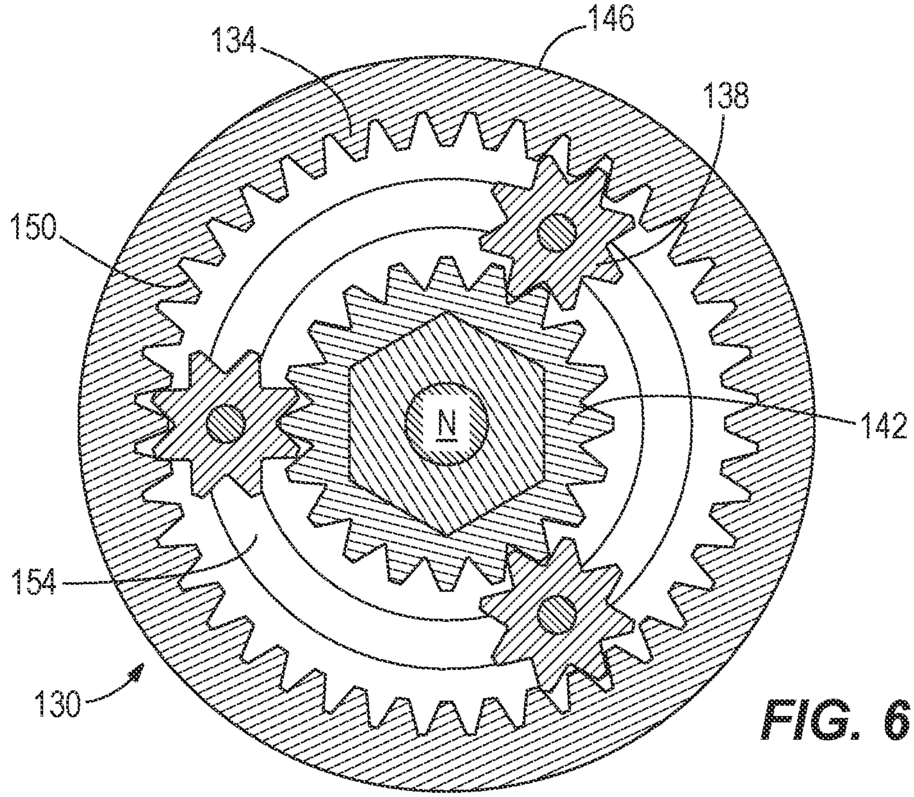
FIG. 6 is a top view of an alternative configuration of a nut ring for use with the bolt tensioning tool of FIG. 5.

With reference to FIG. 6, rather than using an offset gear train (i.e., the meshed transfer and nut gears) to provide torque to the nut gear, a planetary gear train 130 may alternatively be used. The planetary gear train includes an outer ring 134, a set of planet gears 138, and the nut gear 142. The outer ring 134 includes an outer surface 146 and a toothed inner circumference 150. The outer surface 146 can be knurled or include other grip enhancing features. The planet gears 138 are rotatably supported upon a carrier 154 and are meshed with the toothed inner circumference 150 and the nut gear 142. The nut gear 142 surrounds the nut N, in the same manner as the nut gear 142 shown in FIGS. 4 and 5.

To operate, torque from the secondary motor 106 can be transferred to the outer ring 134, which rotates the outer ring 134. The planet gears 138 also rotate about their respective axes as a result of the meshed connection with the toothed inner circumference 150 of the outer ring 134. Finally, the meshed connection between the planet gears 138 and the nut gear 142 rotates the nut gear 142, which rotates the nut N as described above for tightening to the workpiece W. Alternatively, the outer ring 134 may be manually rotated by the user instead of being rotated by the secondary motor. The outer ring 134 may include a set of apertures (not shown) for engaging with a rod or tool to allow for increased torque during manual rotation. The outer ring 134 may also include a protruding handle (not shown) which can be operated by the user to manually rotate the outer ring 134. The protruding handle may be fixed to the outer ring 134 or may be movably attached to the outer ring 134 to move between a stowed position and a deployed position.

In some embodiments, the tensioning tool 10*b* may include a discontinuous drive system. For example, a ratcheting linkage could be added to the transfer gear 114 or the nut gear 118 to increase the mechanical advantage. In some embodiments, the tensioning tool 10*b* may include a torsional impacting system in the planetary gear train 130. A sleeve inside the carrier 154 with internal cam grooves may secure a substantially hollow hammer, which is biased forwardly by a spring. The hammer, as it is rotated, will apply striking rotational impacts to the nut gear 142. In some embodiments, the nut N is engaged by a push-pull cable rather than a gear train. The push-pull cable can be directly coupled to the nut N or coupled to the nut gear 118, 142. The push-pull cable may be a supplementary system, reserved for the final tightening of the nut.

Figure 7:
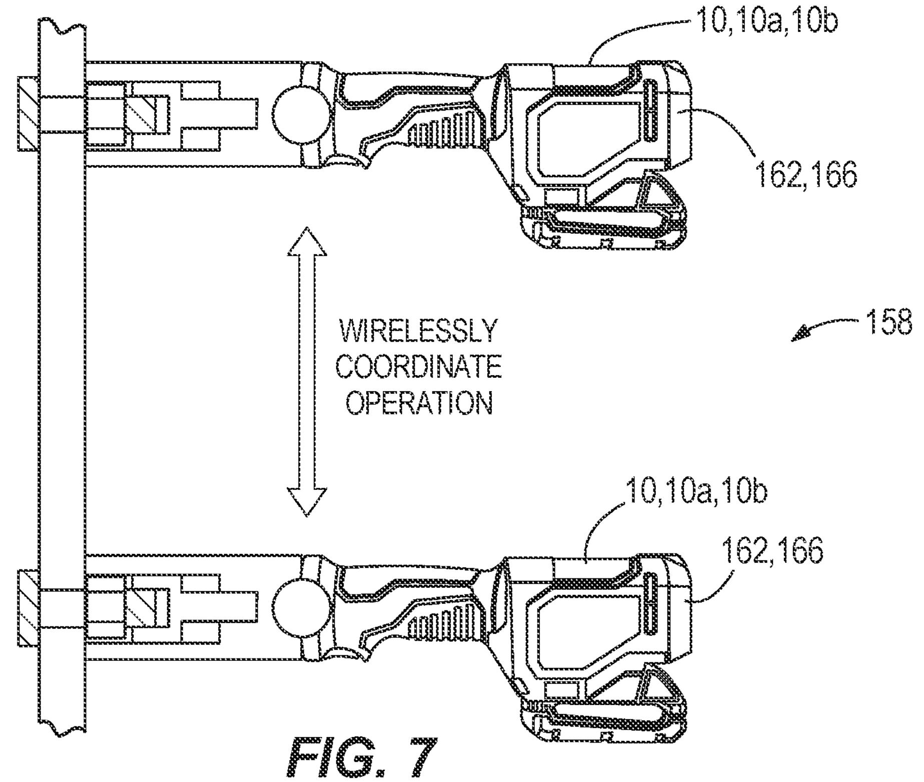
FIG. 7 is a schematic view of an exemplary bolt tensioning tool system.
Figure 8A:
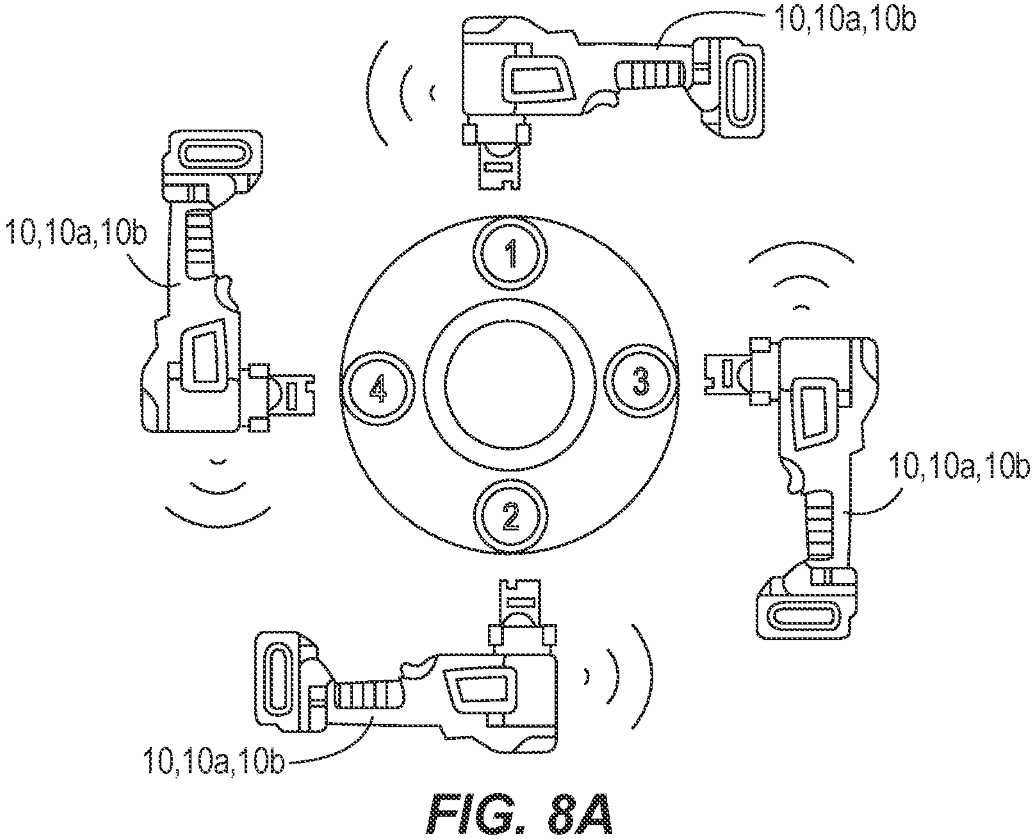
FIG. 8A is a schematic view of a second exemplary bolt tensioning tool system.
Figure 8B:
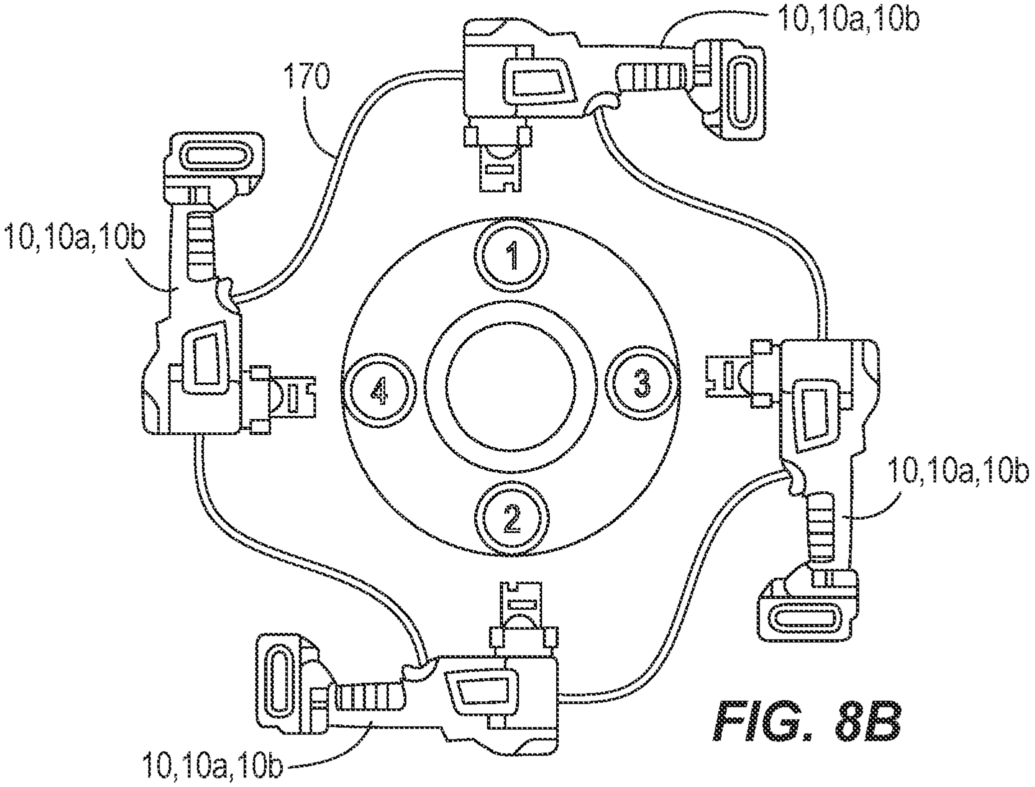
FIG. 8B is a schematic view of a third bolt tensioning tool system.
Figure 9:
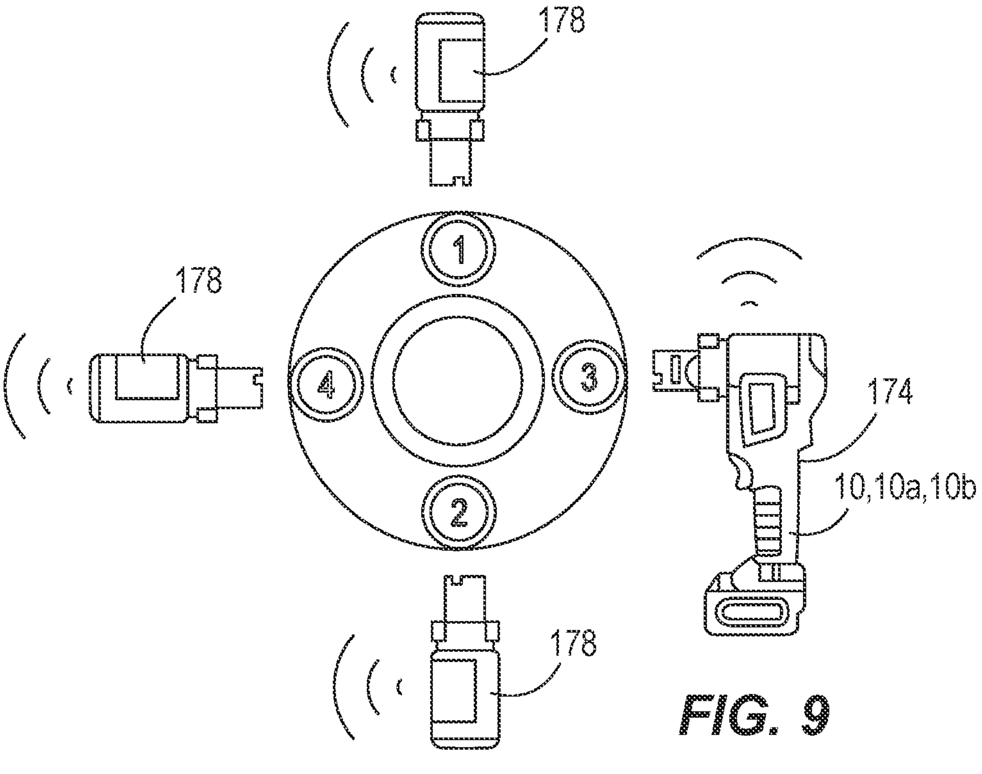
FIG. 9 is a schematic view of a fourth bolt tensioning tool system.

In some instances, it is desirable to simultaneously tension multiple bolts in order to provide a consistent clamping force on the workpiece W. In these cases, a bolt tensioning system 158 including multiple of the tools 10, 10*a*, 10*b* described and shown above can be used to simultaneously tension multiple, separate bolts (FIG. 7). The tools 10 are able to coordinate their desired pressure, turning of the nuts, safety releases, user input reporting, and other elements of operation. The tools 10 are equipped with a controller 162 and a receiver 166. The controller 162 is operable to send information and instructions to the accompanying tools 10, 10*a*, 10*b*, whereas the receiver 166 is operable to receive instructions and information from the accompanying tools 10, 10*a*, 10*b*. In the illustrated embodiment, the tools 10 communicate wirelessly (FIG. 8A), however in some embodiments the tools 10, 10*a*, 10*b* may be connected by electrical wires 170 (FIG. 8B). Additionally, in some embodiments, the system 158 may be controlled by a lead tool 174 (FIG. 9), and the follower tools 178 may be a reduced form of the tools 10, 10*a*, 10*b* described above. For example, as shown in FIG. 9, the follower tools 178 may omit the handle portion 134 of the housing 14 and the associated trigger 86, whereas the lead tool 174 includes these components for grasping and actuation by the user. In some embodiments, the system 158 may be controlled by a remote controller (not shown) wirelessly connected to one or more of the tools or via an electrical cable.

In addition to tensioning bolts, the system 158 may be used for inspecting tension within bolts of preexisting fastened joints. The tool **10*b* may be used to tension the bolt as described above and the auxiliary system 102 can monitor the nut N for when it is free to spin relative to the workpiece W and bolt B. By this inspection, it can be determined if the bolt B was properly tensioned. Alternatively, once the bolt B reaches a certain tension the auxiliary system 102 can attempt to rotate the nut N and by its inability to rotate, determine if the bolt B was tensioned sufficiently. Alternatively, the tools 10, 10*a*, 10*b*, 10*c* can include a displacement sensor for detecting translation of the piston 54, which can be compared to the tensile force applied to the bolt B to determine whether the bolt B was properly tensioned. Alternatively, the tools 10, 10*a*, 10*b*, 10*c* can include a means for measuring tension. And, bolt inspection includes comparing a measured tension (measured at the piston 54**) to a minimum initial tension and monitoring if the tension begins to decrease or decreases by a set amount as the nut N is torqued. The drop in tension as the nut N is tightened demonstrates to the user that the nut N is taking the load and therefore the bolt B is properly tensioned. Alternatively, once the minimum initial tension is reached, the nut N can be rotated a set further amount. This ensures the bolt B is not over-tensioned. Alternatively, inspection can be performed by applying tension to the bolt B until the nut N is free to back rotate. The nut N is then retightened at the appropriate tension. In all cases, bolt inspection can be incorporated during the bolt installation process.

Figure 10A:
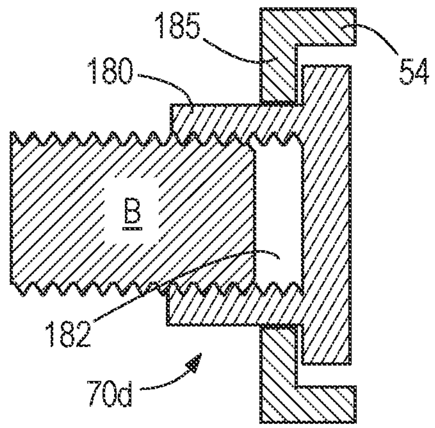
FIG. 10A is a side view of an embodiment of a mount for use with a bolt tensioning tool.

With reference to FIGS. 10A-10G, alternate embodiments of mounts **70*d*-70*i* for use with any of the tools 10-10*e* are shown. A thread-on mount 70*d* is shown in FIG. 10A. The mount 70*d* includes a flange nut 180 with a threaded bore 182 configured to receive the threaded shaft of the bolt B. The flange nut 180 could include driving features (not shown) to assist in threading the flange nut 180 to the threaded shaft of the bolt B. The flange nut 180 is engaged by a claw 184 connected to the piston 54. Pressurized hydraulic fluid then axially displaces the piston 54** in the cylinder (not shown), applying tension to the bolt B.

Figure 10B:
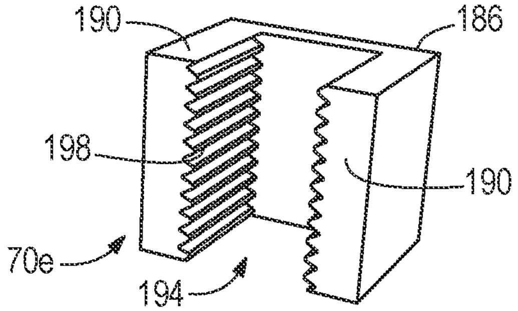
FIG. 10B is a perspective view of another embodiment of a mount for use with a bolt tensioning tool.

FIG. 10B illustrates a slide-on mount **70*e* including a U-shaped body 186 with a pair of opposed walls 190 defining a gap 194 therebetween, and a plurality of teeth 198 formed on the walls 190. The nominal distance between the opposed walls 190 corresponds to a diameter of the bolt B, and the pitch of the adjacent teeth 198 on the walls 190 corresponds with the pitch of the threads on the bolt B. To secure the mount 70*e* to the bolt B, the bolt B is positioned facing the gap 194 such that the threads on the bolt B align with the teeth 198 on the opposing walls 190. The mount 70*e* is then moved in a direction transverse to the bolt B, engaging the threads on the bolt B with the teeth 198 on the opposed walls 190. The bolt B is thereby coupled for movement with the mount 70*e* in an axial direction, such that when an axial force is applied to the mount 70*e*** it is transferred to the bolt B.

Figure 10C:
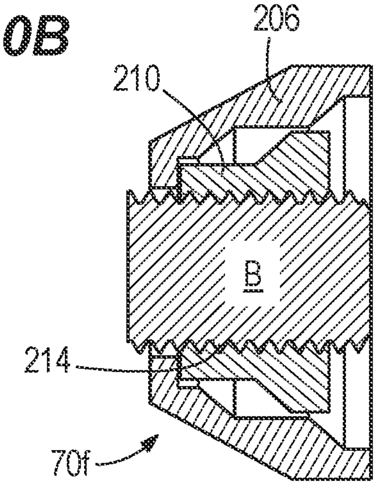
FIG. 10C is a side view of another embodiment of a mount for use with a bolt tensioning tool.

FIG. 10C illustrates a collar mount **70*f* including an outer collar 206 and a plurality of jaws 210 positioned within the collar 206. Each of the jaws 210 includes teeth 214, which are spaced from each other an amount equal to the pitch of the threads on the bold B, permitting the teeth 214 to engage with the corresponding threads on the bolt B. The collar 206 is rotatable between a first axial position, at which the jaws 210 are permitted to move radially away from the bolt B to disengage the teeth 214 from the threads, and a second axial position, where a radial clamping force is applied to the jaws 210 to engage the teeth 214 with the threads on the bolt B, axially unitizing the mount 70*f* with the bolt B. The mount 70*f*** functions similar to the chuck assembly disclosed in U.S. patent application Ser. No. 16/162,790 filed on Oct. 17, 2018, now U.S. Patent Application Publication No. 2019/0111555, the entire content of which is incorporated herein by reference.

Figure 10D:
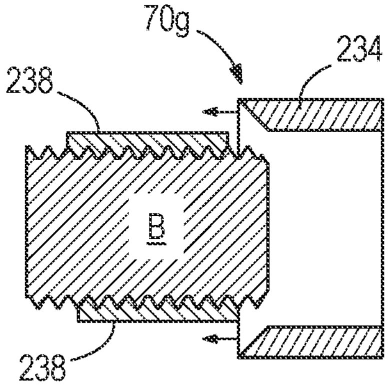
FIG. 10D is a side view of another embodiment of a mount for use with a bolt tensioning tool.
Figure 10F:
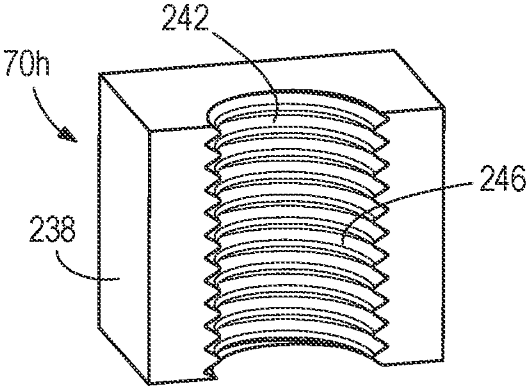
FIG. 10F is a side view of a portion of the mount of FIG. 10E.

FIG. 10D illustrates a sleeve mount **70*g*. The sleeve mount 70*g* includes two half-nuts, such as half-nuts 238 shown in FIG. 10F, engaged with the bolt B and a sleeve 234 in which the half-nuts 238 are received, radially securing the half-nuts 238 to the bolt B. The sleeve 234 is engageable with the half-nuts 238 to axially secure the sleeve 234 to the half-nuts 238, and therefore the sleeve 234 to the bolt B, axially unitizing the sleeve mount 70*g* with the bolt B. In some embodiments, the sleeve 234 is engageable with the half-nuts 238 to retain the half nuts 238 on the bolt B and an axial force is applied directly to the half nuts 238 instead of the sleeve 234. The sleeve 234 may include one or more biasing members (not shown) to preload the half nuts 238 against the bolt B, thereby providing a quick-connect/release mechanism for attaching the mount 70*g*** to the bolt B.

Figure 10E:
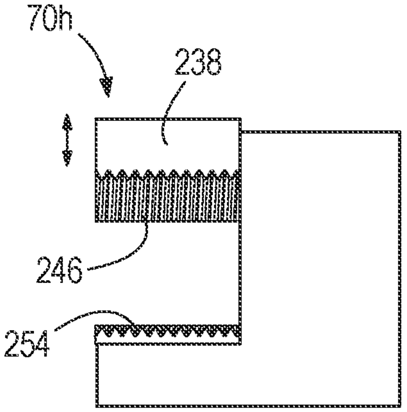
FIG. 10E is a perspective view of another embodiment of a mount for use with a bolt tensioning tool.

FIG. 10E illustrates a half-nut mount **70*h*. The mount 70*h* includes a half-nut 238 (FIG. 10F) with a semi-circular channel 242 having a threaded surface 246 configured to engage the threads on a bolt B. As illustrated in FIG. 10E, the half-nut 238 is disposed across from a toothed flat surface 254. The bolt B is placed between the half-nut 238 and the toothed flat surface 254. Then, the half-nut 238 is moved toward the toothed flat surface 254, engaging the threads of the bolt B with the threads of the threaded surface 246 and the teeth of the toothed flat surface 254, axially unitizing the mount 70*h* with the bolt B. In some embodiments, the toothed flat surface 254** may be curved to match a profile of the bolt B or may include multiple toothed surfaces to contact the bolt B in multiple locations.

Figure 10G:
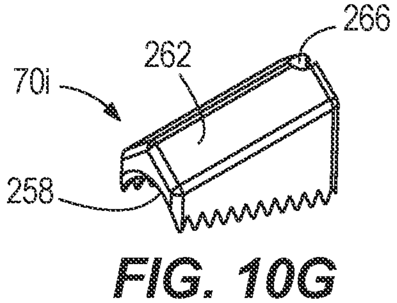
FIG. 10G is a perspective view of another embodiment of a mount for use with a bolt tensioning tool.

FIG. 10G illustrates an exemplary jaw **70*i* for use with a chuck mount like the mount 70*f* shown in FIG. 10C or the chuck assembly disclosed in U.S. patent application Ser. No. 16/162,790 filed on Oct. 17, 2018, now U.S. Patent Application Publication No. 2019/0111555, the entire content of which is incorporated herein by reference. The jaw 70*i* includes a threaded curved surface 258 and a tapered outer surface 262. The jaw 70*i* may also include a vertical slot 266 in which a finger is received to move the jaw 70*i* between a locked position, in which the jaw 70*i* is engaged with the bolt B, and a released position, in which the jaw 70*i*** is disengaged from the bolt B.

Figure 11C:
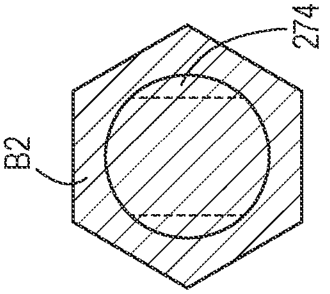
FIG. 11C is an end view of the bolt of FIG. 11A.
Figure 11B:
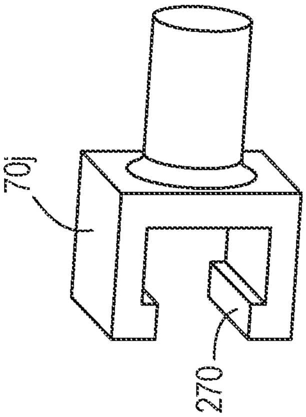
FIG. 11B is a perspective view of the mount of FIG. 11A.
Figure 11A:
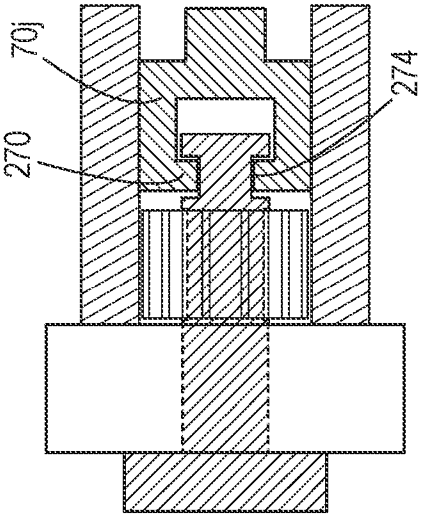
FIG. 11A is a partial cross-sectional view of another embodiment of a mount for use with a bolt tensioning tool, with an associated bolt.

The bolt tensioning tools 10-**10*c* described above are configured for use with a bolt having a threaded shaft. However, in some embodiments, a bolt tensioning tool may include a mount configured to be axially unitized with a non-threaded bolt or a partially-threaded bolt. For example, the mount 70*j* shown in FIGS. 11A and 11B is configured for use with a partially-threaded bolt B2. The mount 70*j* includes parallel, opposed radially inward-extending projections 270. The bolt B2 includes parallel grooves 274 (FIGS. 11A and 11C), which extend in a transverse direction across the width (or diameter) of the bolt B2, and which are an example of an engagement means for axially unitizing the bolt B2 with the bolt tensioning tool 10-10*c*. In use, the mount 70*j* is disposed such that the projections 270 are aligned with the parallel grooves 274. The mount 70*j* is then moved in a transverse direction with respect to the bolt B2, slidably engaging the projections 270 with the parallel grooves 274. Then, when an axial force is applied to the piston 54, the mount 70***j* transfers the force to the bolt B2 by the engagement between the projections 270 and the parallel grooves 274. In some embodiments, a circumferential undercut (not shown) is formed in the bolt rather than discrete, parallel grooves 274.

The bolt tensioning tools 10-10*c* may be used with a specially configured bolt, such as those illustrated in FIGS. 12A-12H. Each bolt includes a head 278, a threaded shaft 282, a yield portion 286, and a gripping portion 290. The head 278 and the threaded shaft 282 are the same as a standard bolt B. The yield portion 286 is configured to indicate to the user when a desired tension has been reached without the need for electronic monitoring systems. The yield portion 286 may be of a length or have a profile to minimize distortion of the threads of the bolt during yielding, thus allowing the fastening to be unfastened, tightened, inspected, or otherwise maintained at a later time. The gripping portion 290 includes an engagement means 298, which allows the bolt to be axially unitized with the tool for performing a bolt tensioning operation. The engagement means 298 can be threads or a non-threaded structure, like any of the engagement means shown in FIGS. 10A-11C. The engagement means 298 may also include a revolved thread pattern rather than a standard spiral thread pattern. Rather than pitched threads, the revolute profile includes a series of ridges extending around the circumference of the gripping portion 290. The revolved thread pattern increases the ease of engagement while also reducing stress concentrations.

Figure 12C:
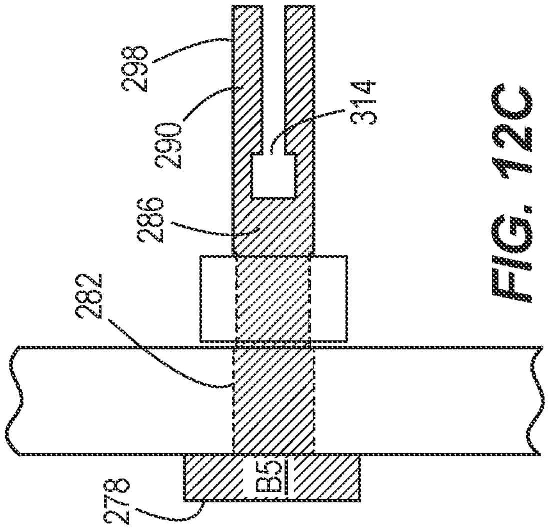
FIG. 12C is a cross-sectional view of another embodiment of a bolt for use with a bolt tensioning tool.
Figure 12B:
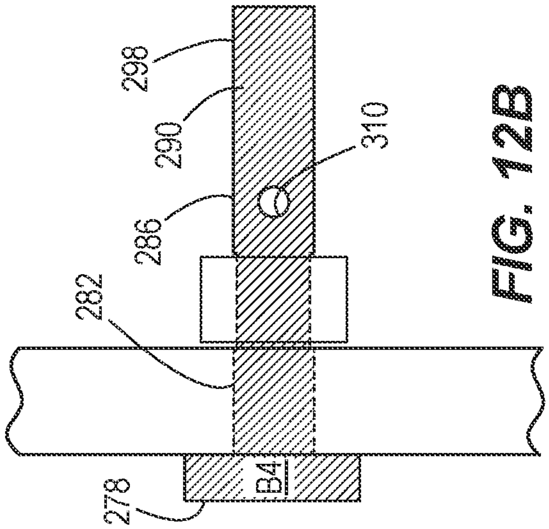
FIG. 12B is a cross-sectional view of another embodiment of a bolt for use with a bolt tensioning tool.
Figure 12A:
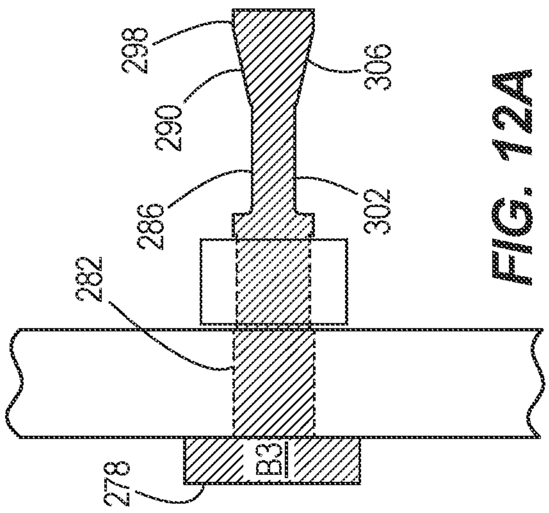
FIG. 12A is a cross-sectional view of an embodiment of a bolt for use with a bolt tensioning tool.

FIG. 12A illustrates a bolt B3 where the yield portion 286 is realized as a small diameter portion 302 of the bolt B3, whereas the engagement means 298 is realized as a reverse-tapered cone 306.

FIG. 12B illustrates a bolt B4 where the yield portion 286 is in the form of a through-hole 310. While the illustrated embodiment shows the through hole 310, the yield portion 286 could also be formed as a slot, a blind hole, a piercing or other similar alternatives. The engagement means 298 is a standard outer threaded surface.

FIG. 12C illustrates a bolt B5 with the yield portion 286 in the form of an internal undercut bore 314. The engagement means 298 is a standard outer threaded surface.

Figure 12F:
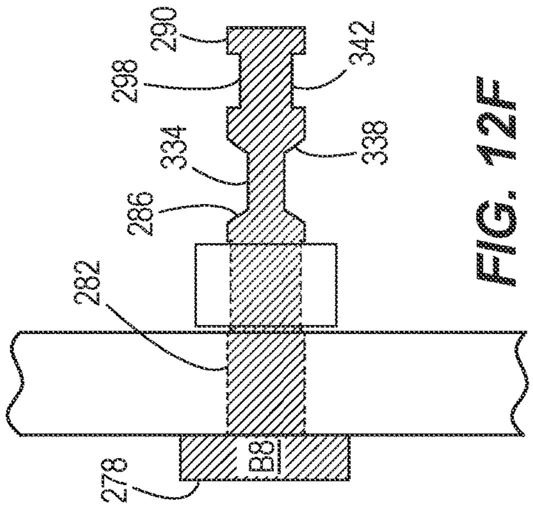
FIG. 12F is a cross-sectional view of another embodiment of a bolt for use with a bolt tensioning tool.
Figure 12E:
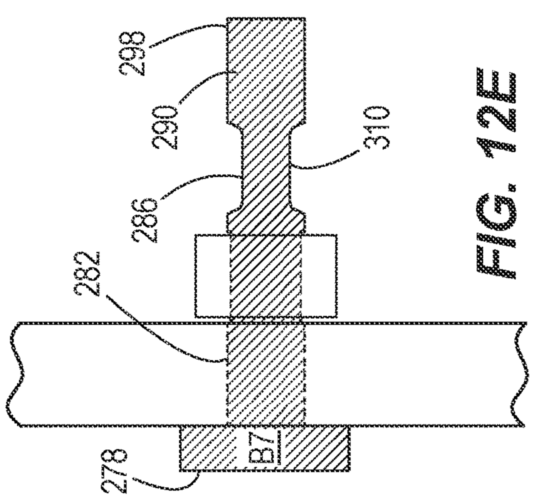
FIG. 12E is a cross-sectional view of another embodiment of a bolt for use with a bolt tensioning tool.
Figure 12D:
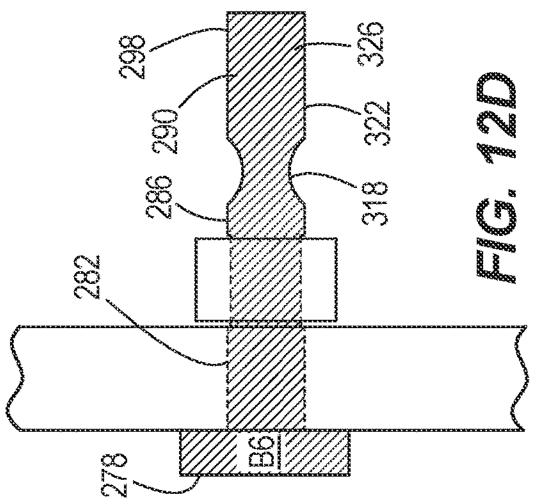
FIG. 12D is a cross-sectional view of another embodiment of a bolt for use with a bolt tensioning tool.

FIG. 12D illustrates a bolt B6 with the yield portion 286 in the form of a circumferential groove 318 in the outer periphery of the bolt B6. The gripping portion 290 of the bolt B5 includes a narrow diameter portion 322. The engagement means 298 is formed as an outer surface 326 having either spiral threads with a different pitch than the threaded shaft 282 or having a revolved thread pattern.

FIG. 12E illustrates a bolt B7 with the yield portion 286 in the form of a reduced diameter neck 330 positioned between the threaded portion 282 and the gripping portion 290 of the bolt B6. The engagement means 298 is a standard outer threaded surface.

FIG. 12F illustrates a bolt B8 with the yield portion 286 in the form of a reduced diameter neck 334 positioned between the threaded portion 282 and the gripping portion 290 of the bolt B7. The engagement means 298 is formed by a circumferential undercut 342 about the periphery of the bolt B8.

Figure 12H:
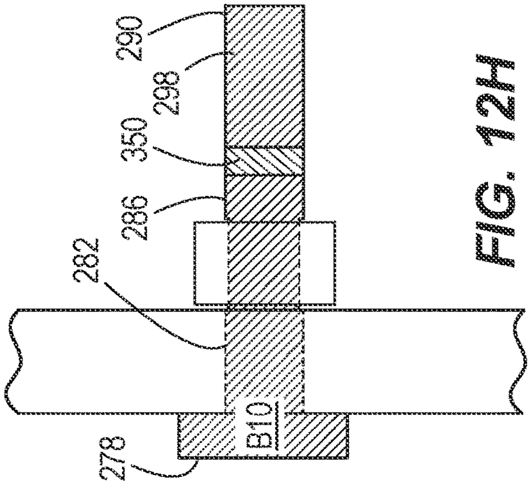
FIG. 12H is a cross-sectional view of another embodiment of a bolt for use with a bolt tensioning tool.
Figure 12G:
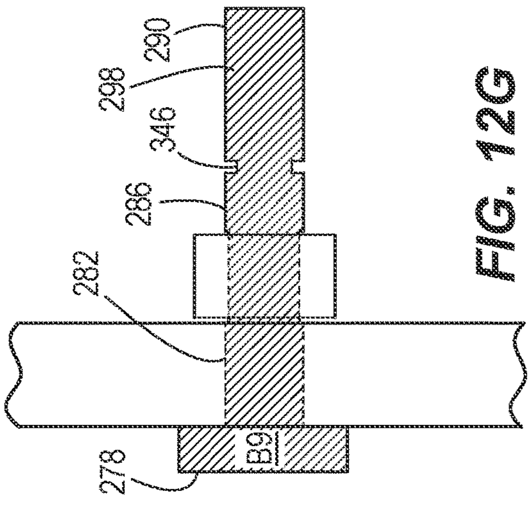
FIG. 12G is a cross-sectional view of another embodiment of a bolt for use with a bolt tensioning tool.

FIG. 12G illustrates a bolt B9 with the yield portion 286 in the form of a circumferential undercut 346 that is narrow in the axial direction and the bottom of which is defined by a small radius, increasing the stress concentration factor at the undercut 346. The engagement means 298 is a standard outer threaded surface.

FIG. 12H illustrates a bolt B10 with the yield portion 286 in the form of a secondary weaker material 350 filling in all or part of the cross-section of the bolt B10. The engagement means 298 is a standard outer threaded surface.

A further bolt B11, not shown, includes a yield portion 286 in the form of a sharp corner in radial profile to cause a stress concentration. The bolt B11 may act similar to a shoulder bolt or reverse shoulder bolt.

The elements of the above disclosed embodiments of bolts B3-B10 can be combined with each other to form new embodiments of bolts.

Figure 14A:
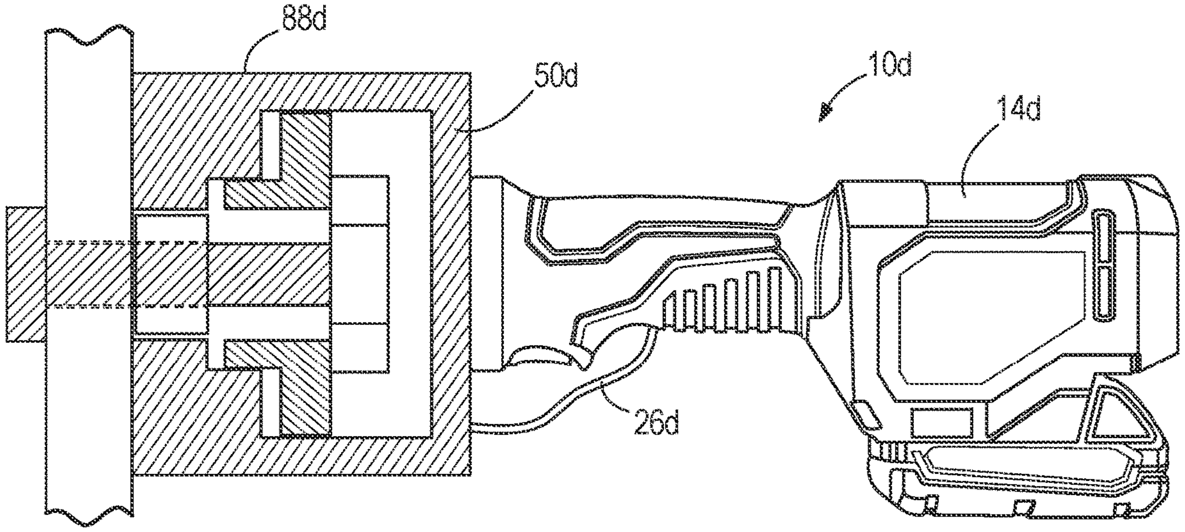
FIG. 14A is a side view of a bolt tensioning tool in accordance with another embodiment of the invention.
Figure 14B:
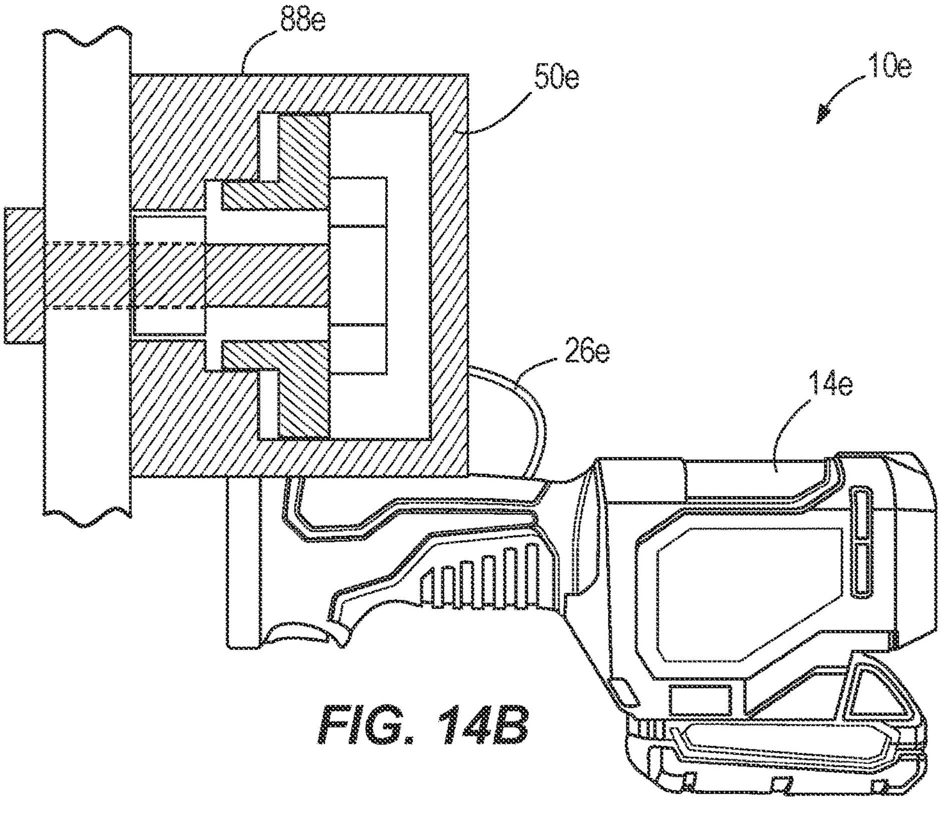
FIG. 14B is a side view of a bolt tensioning tool in accordance with another embodiment of the invention.

A bolt tensioning tool 10*d* in accordance with another embodiment is shown in FIG. 14A, with like components as the bolt tensioning tool 10 of FIG. 1 being labeled with like reference numerals plus the letter "d." The tool 10*d* additionally includes a tensioning assembly 88*d* that is externally mounted of the housing 14*d*. The housing 14*d* still contains the motor and hydraulic pump as described with reference to FIG. 2. A passageway 26*d* extends between the housing 14*d* and the tensioning assembly 88*d*, connecting the hydraulic pump with the cylinder 50*d*. The passageway 26*d* may be formed as an exposed hydraulic hose, as shown, or may be formed as a passageway formed within the cylinder 50*d*. FIG. 14A shows the tensioning assembly 88*d* connected in line with the housing 14*d*, whereas in yet another embodiment, a bolt tensioning tool 10*e* (FIG. 14B) may include a tensioning assembly 88*e* located offset from the housing 14*e*.

Figure 15:
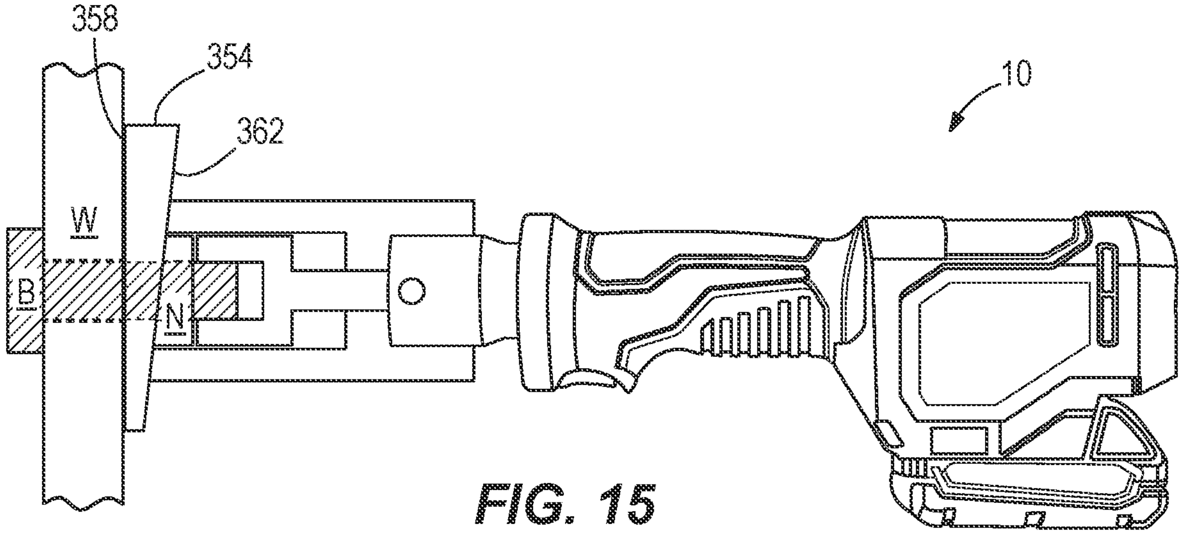
FIG. 15 is a side view of a shim for use with the bolt tensioning tool of FIG. 1

In some situations, tightening a nut after a bolt has been stretched can be difficult given tight spaces and limited access. In these and other situations, it can be preferable to have an alternate way for maintaining the bolt stretch. In some embodiments, as illustrated in FIG. 15, a shim 354 can be used in combination with the bolt tensioning tool 10. The shim 354 includes a workpiece face 358 and a nut face 362. In operation, a bolt tensioning operation is performed, creating a gap between a bottom surface of the nut N and the workpiece W. The shim is placed such that the workpiece face 358 contacts the workpiece W and is slid under the nut N until it completely fills the gap. In some embodiments, the bottom surface of the nut N and the nut face 362 of the shim 354 are both inclined with respect to the workpiece W. In embodiments in which both top and bottom surfaces of the nut N are parallel with the workpiece W, a two-piece shim may be used instead of a single shim. In some embodiments, rather than a nut N, the nut face 362 of the shim 354 interacts with a feature of the bolt like an undercut, a hole, or a slot.

Figure 16:
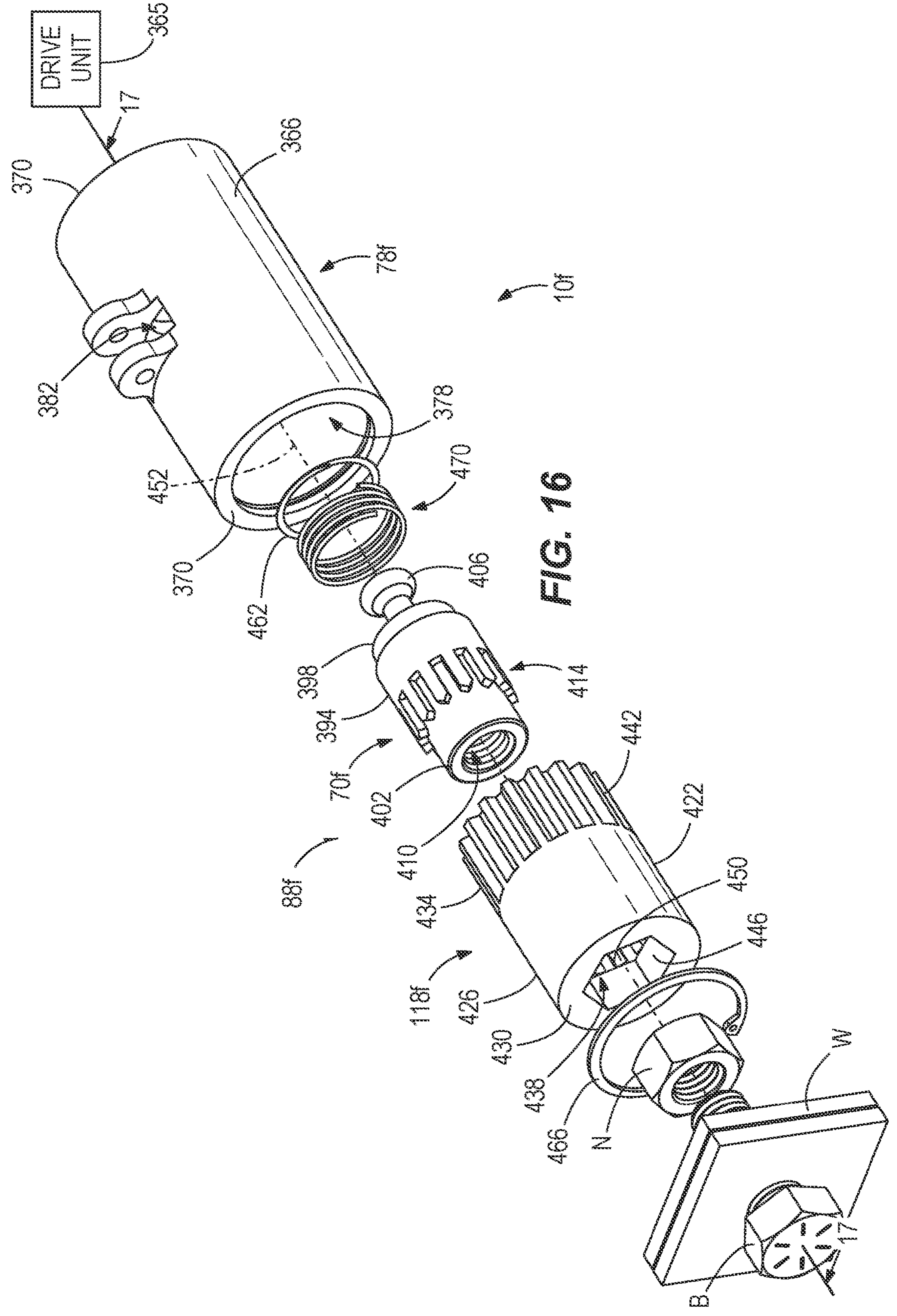
FIG. 16 is an exploded view of a tensioning assembly for use with a bolt tension tool in accordance with another embodiment of the invention.

With reference to FIG. 16, a bolt tensioning tool 10*f* in accordance with another embodiment is shown. Like components are shown with like reference numerals plus the letter "f". The tensioning assembly 88*f* includes an integrated nut gear 118*f*. The tensioning assembly 88*f* includes a piston and a cylinder (not shown, but like piston 54 and cylinder 34 of FIG. 2). The tool 10*f* includes a drive unit 365, including the piston, the cylinder, a motor, and a housing, among other things (not shown but similar to the components described in reference to bolt tensioning tool 10*b* in FIG. 2). The assembly 88*f* further includes an anvil 78*f*, a mount 70*f*, and the integrated nut gear 118*f*. The assembly 88*f* is configured to engage a nut N and a bolt B positioned through a workpiece W.

The anvil 78*f* includes a cylindrical anvil body 366 extending between a closed end 370 and an open end 374. The open end 374 is open to a hollow cavity 378 defined by the anvil 78*f* The anvil 78*f* includes a window 382 in the side of the body 366 that allows additional access to the hollow cavity 378. The closed end 370 includes a piston hole 386 extending therethrough. The mount **70*f*, also referred to herein as engagement puller 70*f*, includes a puller body 394 extending between a first end 398 and a second end 402. The first end 398 includes a stem 406 and the second end 402 includes a threaded bore 410. The threaded bore 410 is threaded to engage the threads of the bolt B. The engagement puller 70*f* further includes a set of external splines 414 extending around the puller body 394 and in the direction of a longitudinal axis 452 of the tensioning assembly 88*f***.

The nut gear **118*f*, also referred to herein as socket 118*f*, includes a generally cylindrical socket body 422 including a first end 426 with a bottom face 430 and an open second end 434. The socket 118*f* defines an inner cavity 438 extending from the bottom face 430 to the second end 434. The socket 118*f* includes a spur gear 442, which may be integrally formed as part of the socket body 422 at the second end 434 or otherwise coupled to the second end 434 for co-rotation with the socket body 422. In some embodiments, the socket 118*f* could include a helical gear, or other suitable geared connection, rather than the spur gear 442. The bottom face 430 includes a socket aperture 446 formed to receive the nut N. The inner cavity 438 includes internal splines 450 positioned adjacent the socket aperture 446 and engaged with the external splines 414 of the puller 70*f***.

The tensioning assembly **88*f* is assembled along the longitudinal axis 452. The engagement puller 70*f* is positioned within the inner cavity 438 of the socket 118*f* so that the threaded bore 410 is facing the bottom face 430 and the stem 406 is toward the open second end 434 of the socket 118*f* The engagement puller 70*f* is movable within the inner cavity 438 between a first, locked position in which the engagement puller 70*f* and socket 118*f* are rotatably coupled, and a second, unlocked position in which the socket 118*f* and the engagement puller 70*f* are free to rotate independently from each other. In the first position, the internal splines 450 are meshed with the external splines 414 on the puller 70*f*. In the second position, the internal splines 450 are disengaged from the external splines 414. The inner cavity 438 includes a first groove 454 for receiving a retaining ring 462. A spring 470 is positioned between the retaining ring 462 and the first end 398 of the engagement puller 70*f* to bias the engagement puller 70*f*** toward the first position.

The socket **118*f* is positioned within the hollow cavity 378 of the anvil 78*f* The hollow cavity 378 may include a second groove 458 adjacent the open end 374 in which a second retaining ring 466 is received. The socket 118*f* is axially secured within the anvil 78*f* between the retaining ring and the closed end 370. The socket 118*f* is therefore translationally fixed to the anvil 78*f*, but free to rotate about the axis 452. In some embodiments, a bearing (not shown) may be positioned between the socket 118*f* and the anvil 78*f*. The piston (not shown) extends through the piston hole 386 in the anvil 78*f* and is engaged with the stem 406 of the engagement puller 70*f* The engagement puller 70*f* is therefore translatable with the piston but free to rotate around the axis 452**.

In some embodiments, an auxiliary system including a second motor (like auxiliary system 106 and motor 106 of FIG. 4) is connected to the tool adjacent the tensioning assembly **88*f* The auxiliary system includes a rotation shaft and a transfer gear (not shown, but like rotation shaft 110 and transfer gear 114 of FIG. 4) that can engage the spur gear 442 of the nut gear 118*f* through the window 382 in the anvil 78*f* When activated, the auxiliary system rotates the socket 118*f* In other embodiments, a tool (not shown) can be fitted through the window 382 and the socket 118*f* can be manually rotated. The spur gear 442 may include additional tool engagement features (not shown) to increase the ease of manual rotation. In still other embodiments, the spur gear 442** may be coupled to the motor that powers the hydraulic pump through a clutch system.

Figure 17:
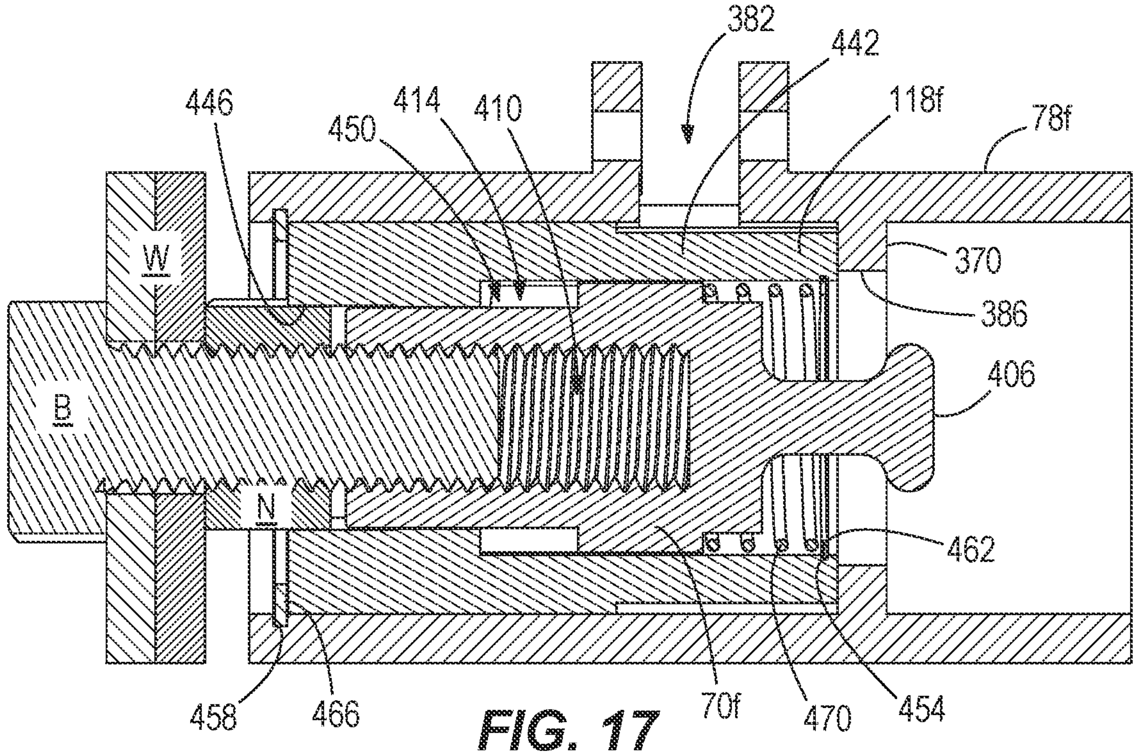
FIG. 17 is a cross-sectional view of the tensioning assembly of FIG. 16 in a first configuration.

In operation, as shown in FIG. 17, the tensioning assembly **88*f* is positioned so the open end 374 of the anvil 78*f* is adjacent the work piece W and the socket aperture 446 surrounds the nut N, which has been fitted onto the bolt B. The piston is in its extended position, allowing the spring 470 to bias the engagement puller 70*f* to the first position (shown in FIG. 17). The shaft of the bolt B is fitted through the socket aperture 446 and into the threaded bore 410 of the engagement puller 70*f* Prior to the bolt B being threaded into the threaded bore 410 of the engagement puller 70*f* (as shown in FIG. 17), the end of the bolt B is aligned with the threaded bore 410, the bolt B is secured against rotation by an operator or external tool, and the socket 118*f* is rotated, threading the bolt B into the threaded bore 410 of the engagement puller 70*f* As the socket 118*f* rotates, the bolt B is pulled into the threaded bore 410 and the nut N is received within the socket aperture 446. Continued rotation of the socket 118*f* turns the nut N about the bolt B and toward the workpiece W, in addition to further threading the engagement puller 70*f* onto the bolt B. The socket 118*f*** is rotated until the nut N is flush with the workpiece W.

Figure 18:
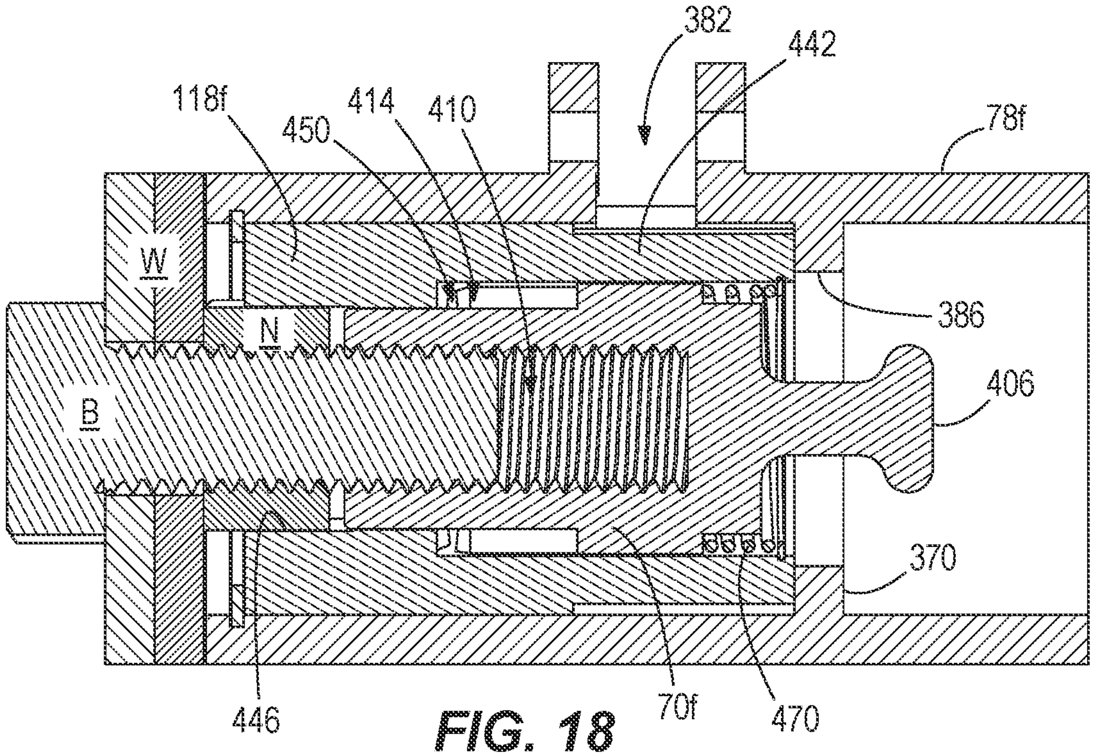
FIG. 18 is a cross-sectional view of the tensioning assembly of FIG. 16 in a second configuration.

With reference to FIG. 18, once the nut N is run down to contact the work piece W, the piston retracts, moving the engagement puller **70*f* to the second position and further compressing the spring 470. The engagement puller 70*f* stretches the bolt B and creates a gap (not shown) between the nut N and the workpiece W. The splines 414, 450 disengage to rotationally unlock the socket 118*f* from the engagement puller 70*f* The socket 118*f* is then rotated again, causing the socket aperture 446 to rotate the nut N without rotating the engagement puller 70*f*** or the bolt B. The nut N is rotated toward the workpiece W until the gap is closed.

Figure 19:
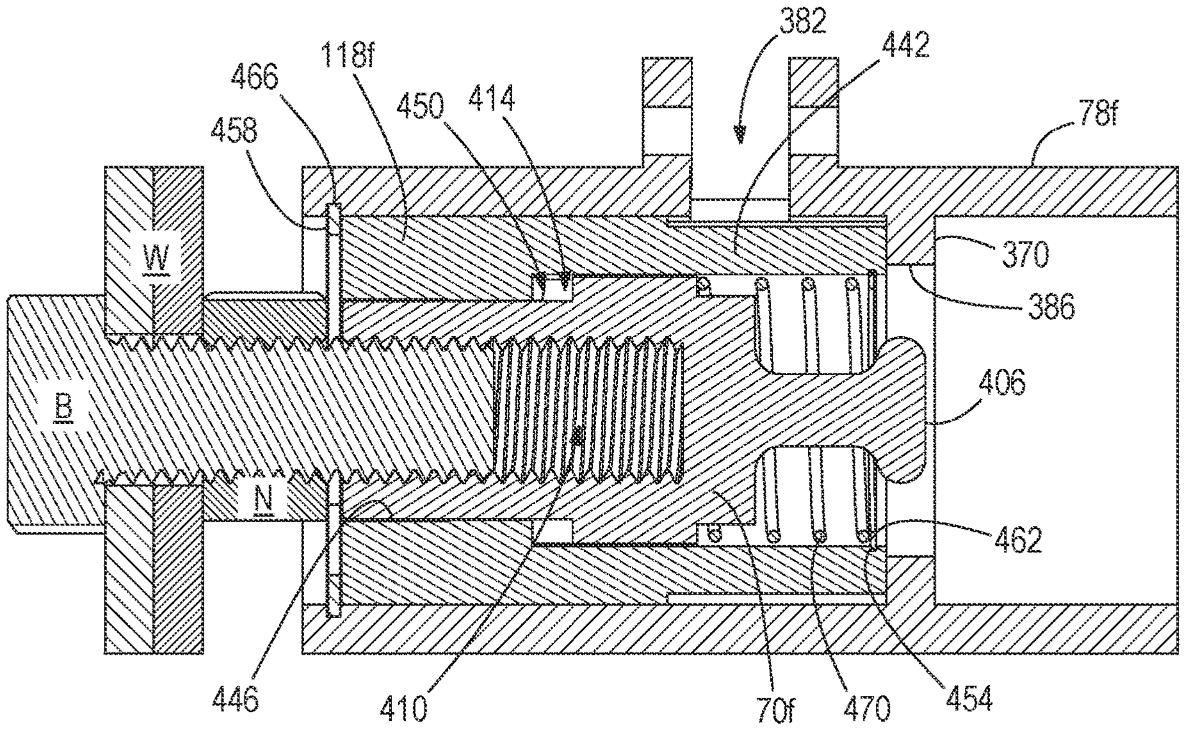
FIG. 19 is a cross-sectional view of the tensioning assembly of FIG. 16 in a third configuration.

With reference to FIG. 19, after the bolt B has been tensioned, the piston returns to its initial or home position, permitting the spring 470 to rebound and bias the engagement puller **70*f* back toward the first position where the splines 414, 450 are meshed to reengage the socket 118*f*. The tool with the attached tensioning assembly 88*f* is then removed from the workpiece W, allowing the nut N to exit the socket aperture 446. Then, the socket 118*f* is rotated in reverse to unthread the engagement puller 70*f*** from the bolt B and the tool is removed from the workpiece W.

The tool **10*f* provides a simpler way to achieve bolt tensioning. The powered rotation allows the nut N to be tightened without additional tools. The integrated nut gear 118*f* allows the tool to be used without needing to attach additional components. The length of the nut gear 118*f* and the position of the window 382** allow the tool to access and tension bolts in hard to reach spaces or on crowded workpieces.

The tool **10*f* can be used in conjunction with the features of any of the other tools 10-10*e*, for example having a pivoting connection between the housing and the tensioning assembly, being used for inspecting tensioned bolts, or having an offset tensioning assembly. The threaded bore may be replaced with another suitable mounting feature, such as those discussed above with reference to FIGS. 10A-11**C.

The tools 10-**10*f* have been disclosed as bolt tensioning tools. However, in some embodiments the tools 10-10*f*** are part of a hydraulic tool system including a housing with a hydraulic pump and motor, and a series of swappable components adapted for different applications. In some embodiments the swappable components may include different threads and sizes for different bolts. In some embodiments, the swappable components may include different mounts configured to attach to different types of fasteners.

Figure 20:
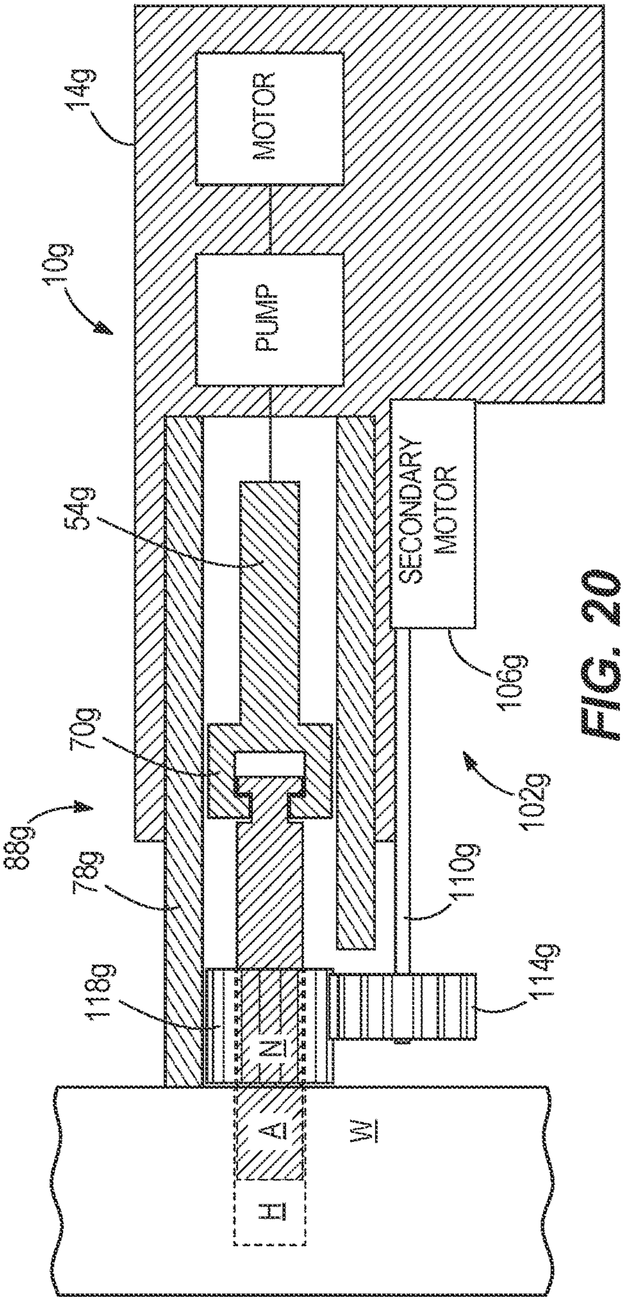
FIG. 20 is a schematic of a handheld hydraulic tool in accordance with a further embodiment of the invention.

In one exemplary embodiment, shown in FIG. 20, a hydraulic hand tool 10*g* includes a housing 14*g* and an installation assembly 88*g* substantially similar to the tool 10, shown in FIG. 2. In the illustrated embodiment, rather than engaging a bolt, the tool 10*f* engages a concrete anchor A, such as a wedge or sleeve anchor. The anchor A is connected to the mount 70*g* and the tool 10*g* is positioned so the anchor A is adjacent a hole H through a concrete workpiece W. The tool 10*g* uses the installation assembly 88*g* to extend the piston 54*g* and drive the anchor A into the hole H. In some embodiments, the anchor A is already driven into the hole H by a hammer before being connected to the tool 10*g*. In other embodiments, the tool 10*g* includes an impact driver in addition to the installation assembly 88*g* to drive in the anchor A. Once the anchor A is seated in the hole H, the piston 54*g* is used to simultaneously pull the anchor A by the exposed threads while an auxiliary system 102*g* turns down a nut N, creating a tight fit and a pretension in the anchor A. Alternately, the nut N can be turned down manually using a separate tool or a hand operate gear assembly, as described above.

Figure 21:
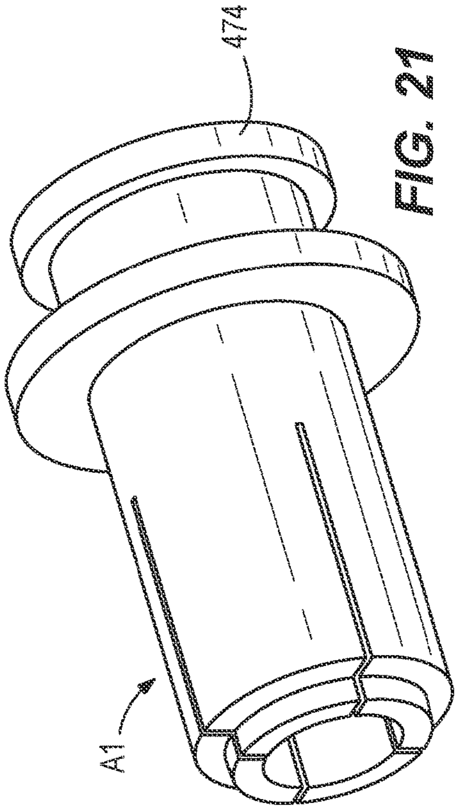
FIG. 21 is a perspective view of a concrete anchor for use with a handheld hydraulic tool in accordance with a further embodiment of the invention.

The anchor A may be a standard anchor or may be a specialty anchor, such as the anchor A1, shown in FIG. 21. The anchor A1 is a drop-in anchor including an additional back flange 274 for engaging with the mount 70*g*.

The tool 10*g* may also be used for inspecting concrete anchors using similar techniques to those described with reference to tools 10-10*f*. The hydraulic tool 10*g* may be used in tandem with other hydraulic tools of the same or different types, as shown in FIGS. 7-9.

Various features of the invention are set forth in the following claims.

What is claimed is:

1. A bolt tensioning tool comprising:

a housing;

an electric motor positioned within the housing;

a hydraulic pump positioned within the housing, the pump being driven by the motor to pressurize hydraulic fluid stored within the housing or a remote reservoir; and a tensioning assembly including a mounting member and a socket, the mounting member connectable to a bolt for applying tension thereto in response to an applied force by the pressurized hydraulic fluid, the mounting member including a first plurality of splines, the socket including an aperture in which a nut threaded to the bolt is receivable and a second plurality of splines that are selectively engageable with the first plurality of splines to couple the mounting member to the socket.

2. The bolt tensioning tool of claim 1, wherein the tensioning assembly includes a piston connectable to the bolt upon which the force is applied by the pressurized hydraulic fluid, and wherein the bolt tensioning tool further comprises an anvil abutted against a workpiece to which the bolt is attached and configured to apply a reaction force to the housing or another component of the bolt tensioning tool in response to displacement of the piston caused by the applied force from the pressurized hydraulic fluid, while the bolt is tensioned, to maintain the housing at a fixed distance relative to the workpiece.

3. The bolt tensioning tool of claim 2, wherein the mounting member is connectable between the piston and the bolt for transferring tension from the piston to the bolt in response to the applied force from the pressurized hydraulic fluid, and the socket is axially retained relative to the anvil but rotatable relative to the anvil.

4. The bolt tensioning tool of claim 3, wherein the mounting member is selectively coupled to the socket for rotation therewith when the first and second plurality of splines are engaged.

5. The bolt tensioning tool of claim 4, wherein the mounting member is movable between a first position, in which the mounting member is coupled to the socket for rotation therewith, and a second position, in which the mounting member is disengaged from the socket and free to rotate relative to the socket.

6. The bolt tensioning tool of claim 5, wherein the mounting member is biased toward the first position by a spring.

7. The bolt tensioning tool of claim 6, wherein the spring is compressed by the mounting member when moving from the first position to the second position in response to translation of the piston from the applied force of the pressurized hydraulic fluid.

8. The bolt tensioning tool of claim 5, wherein the first and second pluralities of splines are engaged when the mounting member is in the first position to transfer torque from the socket to the mounting member, and wherein the first and second pluralities of splines are disengaged when the mounting member is in the second position to prevent torque from being transferred from the socket to the mounting member.

9. The bolt tensioning tool of claim 8, wherein the first plurality of splines are formed on an exterior surface of the mounting member, and wherein the second plurality of splines are formed on an interior surface of the socket.

10. The bolt tensioning tool of claim 3, wherein the mounting member includes a threaded bore in which the bolt is receivable.

11. The bolt tensioning tool of claim 3, wherein the mounting member includes a stem to which the piston is coupled, and wherein the tension is transferred through the stem.

12. The bolt tensioning tool of claim 8, wherein rotation of the socket, with the mounting member in the second position, causes the nut to rotate relative to the bolt.

13. The bolt tensioning tool of claim 3, further comprising a spur gear coupled to the socket, and a rotary output configured to provide torque to the spur gear, causing the nut to rotate relative to the bolt subsequent or during a bolt tensioning operation when the first plurality of splines are disengaged from the second plurality of splines.

14. The bolt tensioning tool of claim 13, wherein the anvil defines a hollow chamber and includes a window providing access to the hollow chamber.

15. The bolt tensioning tool of claim 14, wherein the spur gear is accessible through the window.

16. The bolt tensioning tool of claim 13, wherein the spur gear is integrally formed with the socket as a single piece.

17. The bolt tensioning tool of claim 1, wherein the tensioning assembly includes a piston, upon which the force is applied by the pressurized hydraulic fluid, abutted against a workpiece to which the bolt is attached, and wherein the bolt tensioning tool further comprises an anvil affixed relative to the housing and connectable to the bolt, wherein, in response to displacement of the piston caused by the applied force from the pressurized hydraulic fluid, a tensile force is developed through the anvil to apply tension to the bolt, also displacing the housing relative to the workpiece.

18. The bolt tensioning tool of claim 1, further comprising a rotary output configured to provide torque to a nut disposed on the bolt, causing the nut to rotate relative to the bolt subsequent or during a bolt tensioning operation when the first plurality of splines are disengaged from the second plurality of splines.

19. A bolt tensioning system comprising:

at least two bolt tensioning tools, each tool including a housing, an electric motor positioned within the housing, a hydraulic pump positioned within the housing, the pump being driven by the motor to pressurize hydraulic fluid stored within the housing or a remote reservoir, and a tensioning assembly connectable to a bolt for applying tension thereto in response to an applied force by the pressurized hydraulic fluid;

a controller disposed in a first of the bolt tensioning tools for transmitting instructions to a second of the bolt tensioning tools for performing a bolt tensioning operation; and a receiver in the second bolt tensioning tool to receive the instructions from the first bolt tensioning tool.

20. The bolt tensioning system of claim 19, wherein the tensioning assembly includes a piston connectable to the bolt for applying tension thereto in response to displacement of the piston caused by the pressurized hydraulic fluid, and an anvil abutted against a work piece to which the bolt is attached, wherein the anvil is configured to apply a reaction force to the housing or another component of the bolt tensioning tool while the bolt is tensioned to maintain the housing at a fixed distance relative to the work piece.

21. A bolt tensioning tool comprising:

a housing;

an electric motor positioned within the housing;

a hydraulic pump positioned within the housing, the pump being driven by the motor to pressurize hydraulic fluid stored within the housing or a remote reservoir;

a tensioning assembly connectable to a bolt for applying tension thereto in response to an applied force by the pressurized hydraulic fluid; and a joint between the housing and the tensioning assembly to adjust an orientation of the tensioning assembly relative to the housing.

* * * * *